(12) United States Patent
Vuillaume

(10) Patent No.: US 8,817,980 B2
(45) Date of Patent: Aug. 26, 2014

(54) SEMICONDUCTOR DEVICE AND IC CARD

(71) Applicant: Renesas Electronics Corporation, Kanagawa (JP)

(72) Inventor: Camille Vuillaume, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/686,884

(22) Filed: Nov. 27, 2012

(65) Prior Publication Data
US 2013/0182839 A1  Jul. 18, 2013

(30) Foreign Application Priority Data
Nov. 28, 2011  (JP) ................. 2011-259083

(51) Int. Cl.
G06F 21/00  (2013.01)
H04L 9/00  (2006.01)

(52) U.S. Cl.
CPC ................ H04L 9/002 (2013.01); H04L 9/003 (2013.01)
USPC .......................................................... 380/44

(58) Field of Classification Search
None
See application file for complete search history.

(56) References Cited

U.S. PATENT DOCUMENTS

| | | | | |
|---|---|---|---|---|
| 6,480,605 | B1* | 11/2002 | Uchiyama et al. | 380/30 |
| 7,634,084 | B2* | 12/2009 | Futa et al. | 380/28 |
| 2002/0176573 | A1* | 11/2002 | Futa et al. | 380/44 |
| 2004/0049526 | A1* | 3/2004 | Joye et al. | 708/250 |
| 2005/0027764 | A1* | 2/2005 | Agrawal et al. | 708/250 |
| 2008/0226064 | A1* | 9/2008 | Douguet et al. | 380/30 |
| 2009/0122980 | A1* | 5/2009 | Ciet et al. | 380/30 |
| 2009/0175441 | A1* | 7/2009 | Boscher et al. | 380/28 |
| 2010/0064142 | A1* | 3/2010 | Matsuzaki | 713/189 |
| 2010/0306295 | A1 | 12/2010 | Daemen et al. | |

FOREIGN PATENT DOCUMENTS

JP  2010-277085 A  12/2010

OTHER PUBLICATIONS

Richard Crandall, Prime Numbers: A Computational Perspective, Springer, 2005, pp. 117-223.*
Alfred J. Menezes and Paul C. van Oorschot and Scott A. Vanstone, "Handbook of Applied Cryptography", CRC Press, Chapter 4—Public Key Parameters, Oct. 1996.
Gebhard Bockle, "The Miller-Rabin test with randomized exponents", [online], Mar. 23, 2006, Homepage of Prof. Dr. G. Böckle, HyDell Heidelberg University, searched on Nov. 25, 2011, at URL:http://www.iwr.uni-heidelberg.de/groups/arith-geom/boeckle_old_design/preprints.html.

* cited by examiner

*Primary Examiner* — Benjamin Lanier
(74) *Attorney, Agent, or Firm* — Miles & Stockbridge P.C.

(57) ABSTRACT

In power residue calculation in the primality determination, in addition to the conventional randomization of an exponent, a modulus is also randomized. A random number generated by a random number generator is set to a randomizing number, and is input to a modulus generator and an exponent generator. The modulus generator and the exponent generator randomize a prime number candidate P using the randomizing number to generate a randomized modulus R1 and exponent R2. Using the randomized modulus R1 and exponent R2, the power residue calculation for primality determination is executed, and based on the result, the primality of the prime number candidate P is determined. The power consumption during the primality determination of a semiconductor device becomes noncorrelated with a value of a prime number candidate to be determined, and the leakage of a prime number due to side channel attacks can be prevented.

17 Claims, 12 Drawing Sheets

FIG. 12

GENERATION EXAMPLE OF RANDOMIZING NUMBERS r1, r2

| RANDOM NUMBER | RANDOMIZING NUMBER r1 | RANDOMIZING NUMBER r2 | t[0]-t[6] |
|---|---|---|---|
|  | 1 | 1 | 0 0 0 0 0 |
| 4 | 1 × r[4]=11 | 1 × (r[4]-1)=1 × (11-1)=10 | 0 0 0 1 0 |
| 1 | 11 × r[1]=11 × 3=33 | 10 × (r[1]-1)=10 × (3-1)=20 | 1 0 0 1 0 |
| 2 | 33 × r[2]=33 × 5=165 | 20 × (r[2]-1)=20 × (5-1)=80 | 1 1 0 1 0 |
| 4 | 165 × r[3]=165 × 11=1,815 | 80 × r[4]=80 × 11=880 | 1 1 0 2 0 |
| 2 | 1815 × r[2]=1815 × 5=9075 | 880 × r[2]=880 × 5=4400 | 1 2 0 2 0 |
| 3 | 9075 × r[3]=9075 × 7=63525 | 4400 × (r[3]-1)=4400 × (7-1)=26400 | 1 2 1 2 0 |
| 2 | 63525 × r[2]=63525 × 5=317625 | 26400 × r[2]=26400 × 5=132000 | 1 3 1 2 0 |

SEMICONDUCTOR DEVICE AND IC CARD

CROSS-REFERENCE TO RELATED APPLICATION

The disclosure of Japanese Patent Application No. 2011-259083 filed on Nov. 28, 2011 including the specification, drawings and abstract is incorporated herein by reference in its entirety.

BACKGROUND

The present invention relates to semiconductor devices for carrying out primality determination, and in particular relates to techniques effective in protection from side channel attacks to encryption or the like.

The encryption key used for encryption is often generated based on a prime number. For example, in generating a public key and a private key of RSA encryption, two large prime numbers need to be generated. Two prime numbers need to be kept in secret because if these two prime numbers leaked, the calculation of the private key from the public key is easy.

The prime number generation is usually carried out by the following method. First, a random number is generated, and then the primality of the random number is checked by primality determination, such as a Fermat test, a Miller-Rabin test, and a Solovay-Strassen test (Non-Patent Document 1; Alfred J. Menezes and Paul C. van Oorschot and Scott A. Vanstone, "Handbook of Applied Cryptography", CRC Press, Chapter 4—Public Key Parameters, October 1996). Usually, the primality determination includes power residue calculation (modular exponentiation calculation, modulo exponentiation calculation). For example, when the primality determination of an integer P is carried out based on the Fermat test, an integral random number A is selected and power residue $A^{P-1}$ mod P is calculated.

According to Euler's theorem, when N is a positive integer and A and N are positive integers relatively prime to each other, $A^{\phi(N)}$ mod N=1 (Exp. 1) is established. Here, $\phi$ is the Euler function. When P is a prime number, $\phi(P)=P-1$ and it is guaranteed that the result of the power residue calculation $A^{(P-1)}$ mod P is one.

Because a prime number is relatively rare, the determination of many prime number candidates is often carried out until a prime number is found. For the reason of efficiency, when a prime number candidate fails in the primality determination, this prime number candidate is preferably incremented.

Because a prime number at the time of generation of an RSA encryption key is important for security of an encryption system, the prime number is a target for potential attack, such as side channel analysis, in which during power residue calculation in the primality determination, the power consumption caused by generation of a prime number is measured and the value of the prime number is leaked using a pattern of the power consumption. Because in the incremental prime number generation, the power residue calculation targeted for mutually close integers (P, P+2, P+4, etc.) is executed, the risk of such an attack is amplified.

SUMMARY

The invention disclosed in Patent Document 1 (Japanese Patent Laid-Open No. 2010-277085) utilizes a preliminary evidence integer in order to detect the disturbance in the output of prime number generation due to fault attacks. However, Patent Document 1 does not discuss the leakage problem in the primality determination.

In Non-Patent Document 2 (Gebhard Bockle, "The Miller-Rabin test with randomized exponents", [online]. Mar. 23, 2006, Homepage of Prof. Dr. G. Bockle, HyDell Heidelberg University, searched on Nov. 25, 2011, at URL:http://www.i-wr.uni-heidelberg.de/groups/arith-geom/boeckle_old_design/preprints.html), there is disclosed a variant of the Miller-Rabin primality determination method in which an exponent is randomized. Because the exponent of power residue is randomized, the power consumption in the power residue calculation is disturbed and the risk of leakage of a prime number decreases. However, because the modulus is not randomized, the leakage cannot be completely prevented.

Randomizing of a modulus is not easy because it affects the result of power calculation, i.e., the result of primality determination. This can be easily understood when the Fermat test with Expression (2) below is considered.

$$A^{P-1}=1 \bmod P \tag{Exp. 2}$$

Here, "$A^{P-1}=1$ mod P" is an expression indicating that the result of the power residue $A^{P-1}$ mod P is 1, and is the expression form widely used by those skilled in the art.

When the exponent P−1 is multiplied by an arbitrary random number r and randomized, the result of power calculation with the randomized exponent will not change but remain as $$A^{r(P-1)}=1 \bmod P \tag{Exp. 3}$$

On the other hand, in the case of a modulus sP randomized using an arbitrary random number s, usually $$A^{P-1} \neq 1 \bmod sP \tag{Exp. 4}$$

and $$A^{r(P-1)} \neq 1 \bmod sP \tag{Exp. 5}$$

Even if a prime number candidate P is a prime number, a product sP of the prime number candidate P and the random number "s" is not a prime number and therefore the primality of P cannot be determined by the Fermat test.

The present invention has an object to randomize the modulus of the power residue and thus prevent a prime number from leaking in a semiconductor device for carrying out primality determination.

The other purposes and the new feature of the present invention will become clear from the description of the present specification and the accompanying drawings.

The following explains briefly the outline of a typical invention among the inventions disclosed in the present application.

That is, in a semiconductor device for carrying out primality determination including power residue calculation (modular exponentiation calculation, modulo exponentiation calculation), a product of a prime number candidate and a random number is set to the modulus of the power residue calculation.

The following explains briefly the effect acquired by the typical invention among the inventions disclosed in the present application.

That is, because the modulus in power residue calculation is randomized, the power consumption of the semiconductor device for carrying out power residue calculation is independent of the value of a prime number candidate, and as a result, leakage of a prime number at the time of primality determination is prevented.

BRIEF DESCRIPTION OF THE DRAWINGS

FIG. 12 shows a numerical example in the generation process of randomizing numbers using a table of small prime numbers.

DETAILED DESCRIPTION

1. Overview of Embodiments

Figure 1:
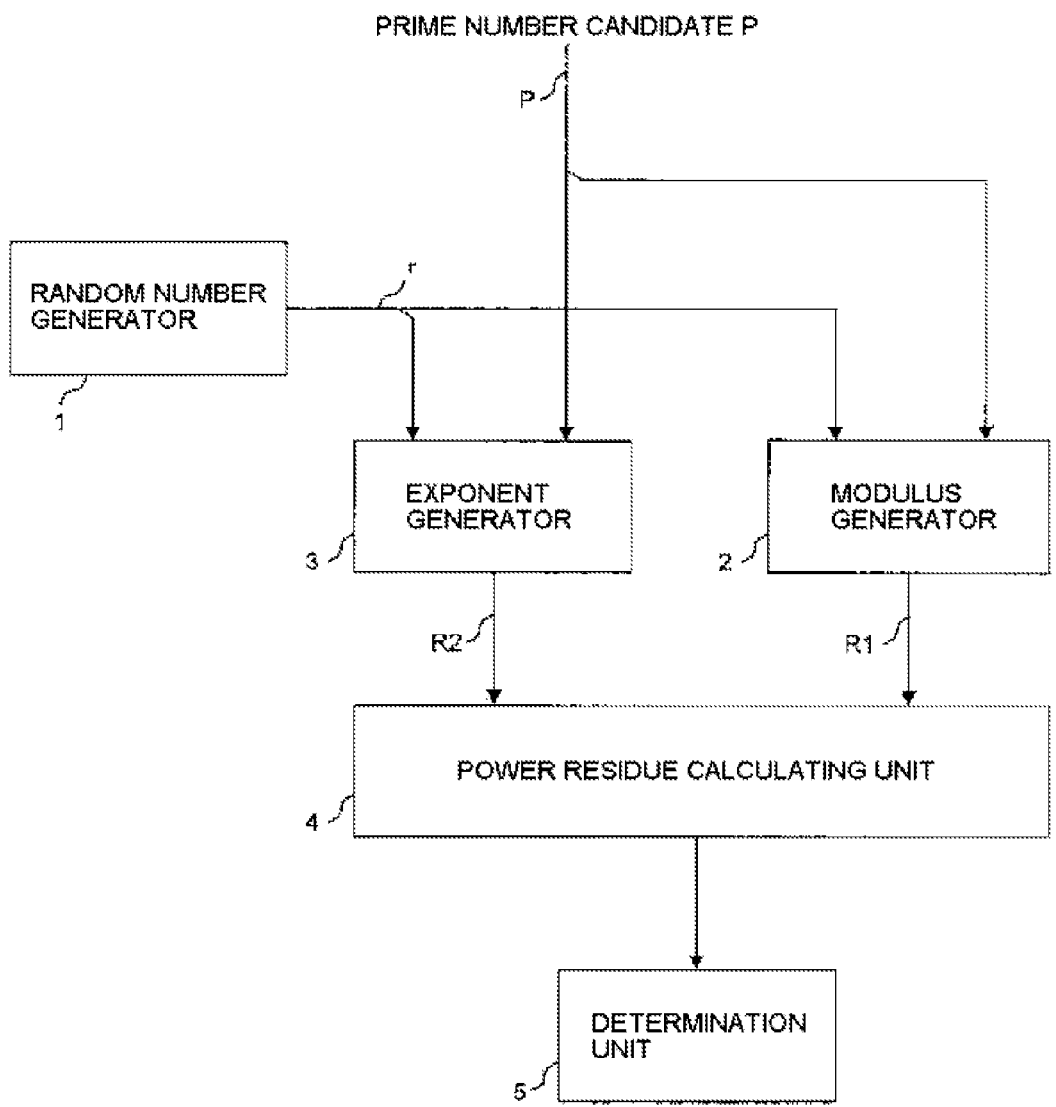
FIG. 1 is a block diagram of a semiconductor device for carrying out primality determination of a prime number candidate, according to an embodiment of the present invention.

First, the overview of a typical embodiment of the invention disclosed in the present application is described. In the overview description of the typical embodiment, a reference numeral referred to with parentheses in the drawings simply illustrates what is included in the concept of a component with the reference numeral attached thereto.

[1] <Randomization of Modulus in Power Residue Calculation (High Level Concept)>

There is provided a semiconductor device including a random number generator (1), a modulus generator (2), an exponent generator (3), a power residue calculating unit (4), and a determination unit (5), and determining primality of an input prime number candidate (P), in which each component carries out the following operation.

The random number generator generates a first random number as a randomizing number (r), and the modulus generator generates a first integer (R1) based on the prime number candidate and the randomizing number, and the exponent generator generates a second integer (R2).

The power residue calculating unit carries out power residue calculation, with the first integer as a modulus and the second integer as an exponent, and the determination unit determines primality of the prime number candidate based on an output of the power residue calculating unit.

Thus, the modulus in the power residue calculation is randomized, and therefore the power consumption of the semiconductor device for carrying out power residue calculation becomes independent of the value of the prime number candidate, and as a result, leakage of a prime number at the time of primality determination is prevented.

[2] <Fermat Test with Randomized Exponent and Modulus (Embodiment 1)>

There is provided a semiconductor device including a random number generator (1), a modulus generator (2), an exponent generator (3), a power residue calculating unit (4), and a determination unit (5), and determining primality of an input prime number candidate (P), in which each component carries out the following operation.

The random number generator generates a first random number as a randomizing number (r), and the modulus generator generates a product (rP) of the prime number candidate and the randomizing number as a first integer (R1), and the exponent generator generates a product (r−1)(P−1) of a number obtained by subtracting one from the prime number candidate and a number obtained by subtracting one from the randomizing number, as a second integer (R2).

The power residue calculating unit carries out power residue calculation, with the first integer as a modulus and the second integer as an exponent, and the determination unit determines primality of the prime number candidate based on an output of the power residue calculating unit.

Thus, both the modulus and exponent of the power residue calculation in the Fermat test are randomized, and therefore the power consumption of the semiconductor device for carrying out power residue calculation becomes independent of the value of the prime number candidate, and as a result, leakage of a prime number at the time of primality determination is prevented.

[3] <Randomization by a Small Prime Number>

There is provided the semiconductor device of Item [2] further including a randomizing number generator (6), in which the random number generator generates a first random number and inputs the same to the randomizing number generator, and the randomizing number generator generates the first random number as the randomizing number when the first random number is a prime number.

Thus, the probability that an error of false negative or false positive in the primality determination occurs can be reduced, and the efficiency of the determination can be improved. The error of false negative refers to an error that a prime number candidate is determined as not a prime number although it is a prime number, while the error of false positive refers to an error that a prime number candidate is determined as a prime number although it is not a prime number. The principle of reducing the probability of occurrence of the error will be described in detail in Embodiment 2.

[4] <Method of Calculating a Small Prime Number (Prime Number Equal to or Less than a Predetermined Value L)>

There is provided the semiconductor device of Item [2] further including a randomizing number generator (6), in which the random number generator generates a second random number and inputs the same to the randomizing number generator, and the randomizing number generator calculates the randomizing number by the following method.

A second random number equal to or less than a predetermined value L is generated by the random number generator (1) (401), and the randomizing number generator (6) generates the second random number as the randomizing number when the second random number satisfies all the conditions 1 to 3 below.

Condition 1: the second random number does not have a prime number smaller than a predetermined value A, as a factor (411-415).

Condition 2: the result of the power residue calculation is one when the predetermined value A is set to the base, a number obtained by subtracting one from the second random number is set to the exponent, and the second random number is set to the modulus (421, 422).

Condition 3: an integer is equal to or less than the predetermined value L; and the result of power residue calculation, when the predetermined value A is set to the base, a number obtained by subtracting one from the integer is set to the exponent, and the integer is set to the modulus, is one but the integer is not a prime number; and the second random number differs from any one of the integers when compared with all of the integers (431-436).

Thus, a prime number suitable for a randomizing number can be calculated using a simple method, and can be implemented also into a low-end device, such as an IC card.

[5] <Sieving of Prime Number Candidate>
In the semiconductor device of Item [2], [3], or [4], it is determined whether or not the prime number candidate (P) is divisible by at least one prime number.

When as the result of the determination it is divisible, the next prime number candidate is generated.

When as the result of the determination it is not divisible, the prime number candidate is input to the modulus generator (2) and the exponent generator (3).

Thus, when it is easily known that the prime number candidate (P) is not a prime number, prior to the power residue calculation the determination of "Fail" (the determination indicating that the prime number candidate (P) is not a prime number) can be output and the procedure can proceed to the next prime number candidate, and therefore in a series of primality determinations, the number of times of execution of the power residue calculation having a large calculation load can be reduced.

[6] <Fermat Test to Generate a Random Number by Using the Exponent in Prime Factorization as a Random Number (Embodiment 2)>
There is provided a semiconductor device including a random number generator (1), a randomizing number generator (6), a modulus generator (2), an exponent generator (3), a power residue calculating unit (4), and a determination unit (5), and determining primality of an input prime number candidate (P), in which each component carries out the following operation.

The random number generator generates one or more fourth random number sequences (j1, j2, j3, . . . ) (722), and the randomizing number generator generates a randomizing number by prime factor calculation with an integer (t[j]) calculated based on the fourth random number sequence as the exponent (724, 725).

The modulus generator generates a first integer (R1) that is a product of the prime number candidate and the randomizing number (741), and the exponent generator generates a second integer (R2) (742).

The power residue calculating unit carries out power residue calculation, with the first integer as a modulus and the second integer as an exponent (745), and the determination unit determines the primality of the prime number candidate based on an output of the power residue calculating unit (750).

Thus, both the modulus and exponent of the power residue calculation in the Fermat test are randomized, and therefore the power consumption of the semiconductor device for carrying out power residue calculation becomes independent of the value of the prime number candidate, and as a result, leakage of a prime number at the time of primality determination is prevented, and furthermore the randomizing number for randomization is not limited to a prime number.

[7] <Use of Prime Number Table; Randomizing Number=$\pi r(j)^{t[j]}$ $1 \leq j \leq k$>
There is provided the semiconductor device of Item [6], in which each component carries out the following operation.

The random number generator (1) outputs a random number (j), whose value is equal to greater than one and equal to or less than k, as an exponent specifying random number (722).

The randomizing number generator (6) includes a first array (r[k]) including k elements for storing k mutually different prime numbers and a second array (t [k]) including k elements for storing exponents corresponding to the respective prime numbers, in which a number of times specified by the exponent specifying random number is set to the value of an element of the second array (726).

For a prime number that is the value of each element of the first array, k integers are calculated by power calculation with the value of a corresponding element of the second array as the exponent, and a product of the k integers is calculated, and is output as the randomizing number.

Thus, an alternative method of generating a randomizing number is provided.

[8] <Base and "Randomizing Number×Prime Number Candidate" are Relatively Prime to Each Other>.
There is provided the semiconductor device of Item [6], in which the base in power residue calculation and a product of the randomizing number and the prime number candidate are integers relatively prime to each other (744).

Thus, the probability that the error of false negative occurs can be reduced and the efficiency of primality determination can be improved.

[9] <Randomization of the Modulus in Miller-Rabin Prime Number Determination Method>
There is provided a semiconductor device including a random number generator (1), a modulus generator (2), an exponent generator (3), a power residue calculating unit (4), and a determination unit (5), and determining primality of an input prime number candidate (P), in which each component carries out the following operation.

The random number generator generates a fifth random number as a randomizing number (r).

The modulus generator generates a product of the prime number candidate and the randomizing number as a first integer (821).

The exponent generator factorizes a product of a number obtained by subtracting one from the randomizing number and a number obtained by subtracting one from the first prime number candidate into prime numbers, calculates the maximum integer "s" and integer P' satisfying an expression (r−1)(P−1)=$2^s$P', and generates the integer P' as a second integer (824, 825).

The power residue calculating unit carries out power residue calculation, with the first integer as the modulus and with the second integer as the exponent (841), and the determination unit determines the primality of the prime number candidate based on an output of the power residue calculating unit (842).

Thus, both the modulus and exponent of the power residue calculation in the Miller-Rabin test are randomized, and therefore the power consumption of the semiconductor device for carrying out power residue calculation becomes independent of the value of the prime number candidate, and as a result, leakage of a prime number at the time of primality determination is prevented.

[10] <Loop for Repeating Power Residue Calculation while Varying the Base>

There is provided the semiconductor device of Item [9], in which each component carries out the following operation.

A sixth random number is generated by the random number generator (834), and the sixth random number (A) is selected so as to be a number that is not divisible by the randomizing number (r) (835).

The power residue calculating unit carries out power residue calculation, with the sixth random number as the base, the first integer as the modulus, and the second integer as the exponent.

The determination unit, when the result of the power residue calculation (841) is any one of 1, rP−1, 1−FP ($P^{-1}$ mod r) (r−2) mod rP, or P−1−FP ($P^{-1}$ mod r) (2−P) mod rP, carries out provisional determination that the prime number candidate is a prime number (842).

As long as the provisional determination that the prime number candidate is a prime number is maintained, a fifth random number is generated by the random number generator and set to a new randomizing number r, and a sixth random number is generated and set to a new base A, and the primality is determined by repeating the power residue calculation until the number of times of repetition reaches a predetermined number of times (802).

Thus, both the modulus and exponent of the power residue calculation in the Miller-Rabin test are randomized.

[11] <Pre-Processing of Generating a Small Prime Number>

There is provided the semiconductor device of Item [9] or [10] further including a randomizing number generator (6), in which the randomizing number generator generates the fifth random number as the randomizing number when satisfying the following conditions.

Condition 1: the fifth random number has 32 bits and both of the least significant two bits are 1 (811).

Condition 2: the fifth random number (r) passes all of the Miller-Rabin tests with the base of 2 (812), the Miller-Rabin tests with the base of 7 (814), and the Miller-Rabin tests (816) with the base of 61 (810).

Thus, both the modulus and exponent of the power residue calculation in the Miller-Rabin test are randomized, and a prime number is provided as the randomizing number.

[12] <Randomization of Modulus in Power Residue Calculation, Core of Algorithm (Highest Level Concept)>

There is provided a semiconductor device for carrying out primality determination including power residue calculation, in which a product (rp) of a prime number candidate (P) and a random number (r) is set to the modulus of the power residue calculation.

Thus, the modulus in the power residue calculation is randomized, and therefore the power consumption of the semiconductor device for carrying out power residue calculation becomes independent of the value of the prime number candidate, and as a result, leakage of a prime number at the time of primality determination is prevented.

[13] <Randomization of Modulus and Exponent in Power Residue Calculation>

In the semiconductor device of the item [12], a value calculated based on the prime number candidate and the random number is set to the exponent of the power residue calculation.

Thus, both the modulus and exponent of the power residue calculation in the Fermat test are randomized, and therefore the power consumption of the semiconductor device for carrying out power residue calculation becomes independent of the value of the prime number candidate, and as a result, leakage of a prime number at the time of primality determination is prevented.

[14] <Generation of RSA Encryption Key>

There is provided the semiconductor device of anyone of Items [1] to [13], in which two prime numbers (P, Q) are generated in association with the primality determination, and RSA encryption key generation for outputting a public key and a private key based on the two prime numbers is carried out (391, 392, 691, 692).

Thus, the RSA encryption key (a public key and a private key) is protected from attacks, such as side channel analysis.

[15] <Hardware of IC Card>

There is provided an IC card (100) including the semiconductor device of any one of Items [1] to [13], further including a CPU (101), a coprocessor (102), a random number generation circuit (103), and a memory (105, 106).

The coprocessor carries out the power residue calculation, and the random number generation circuit constitutes the random number generator (1), or alternatively supplies a random number serving as the basis thereto.

Thus, an IC card can be provided, in which the RSA encryption key (a public key and a private key) is protected from attacks, such as side channel analysis.

[16] <Memory of IC Card>

There is provided the IC card of Item [15], in which an RSA key generation program (124, 524) and/or a prime number table (534) are stored in the memory (106).

Thus, an IC card can be provided, in which the RSA encryption key (a public key and a private key) is protected from attacks, such as side channel analysis.

[17] <Key Enrollment in IC Card>

There is provided an IC card including the semiconductor device of any one of Items [1] to [13], in which prior to transaction a private key and a public key are generated in association with the primality determination (201), and the public key is transmitted to a key server that is coupled via an IC card terminal (202).

Thus, an IC card protected from attacks, such as side channel analysis can be provided, and transactions using the IC card can be provided.

2. Detailed Embodiments

Embodiments will be described further in detail.

Embodiment 1

Randomization of Modulus in Power Residue Calculation

FIG. 1 is a block diagram of a semiconductor device according to an embodiment of the present invention.

There is provided a semiconductor device including a random number generator 1, a modulus generator 2, an exponent generator 3, a power residue calculating unit 4, and a determination unit 5, and determining primality of an input prime number candidate P, in which each component carries out the following operation.

The random number generator 1 generates a first random number as a randomizing number r and inputs the same to the modulus generator 2 and the exponent generator 3. The modulus generator 2 generates a first integer R1 based on a prime number candidate P and the randomizing number r, and the exponent generator 3 generates a second integer R2.

The power residue calculating unit 4 carries out power residue calculation, with the first integer R1 as the modulus and the second integer R2 as the exponent, and the determination unit 5 determines the primality of the prime number candidate P based on an output of the power residue calculating unit 4.

Thus, the modulus R1 in the power residue calculation is calculated and randomized based on the randomizing number r, and therefore the power consumption of the semiconductor device for carrying out power residue calculation becomes independent of the value of the prime number candidate P, and as a result, leakage of a prime number at the time of primality determination is prevented.

Here, the first integer R1 is typically a product rP of the prime number candidate P and the randomizing number r. The second integer R2 is calculated, in association with randomization of the modulus in the power residue calculation, so that when the prime number candidate P is the prime number the result of the power residue calculation becomes one or other specific value. When a prime number is set to the modulus, it is mathematically guaranteed that the result of power residue calculation is one, while when the modulus of the power residue is simply randomized, the result of the power residue calculation ends up with one when the value of the randomized modulus is a prime number, and the result of the power residue calculation when the prime number candidate P is a prime number cannot be predicted. In the present invention, by randomizing the modulus and providing the exponent suitable therefor, the result of the power residue calculation becomes a predictable specific value based on the prime number candidate P.

Embodiment 2

Fermat Test with Randomized Exponent and Modulus

Figure 6:
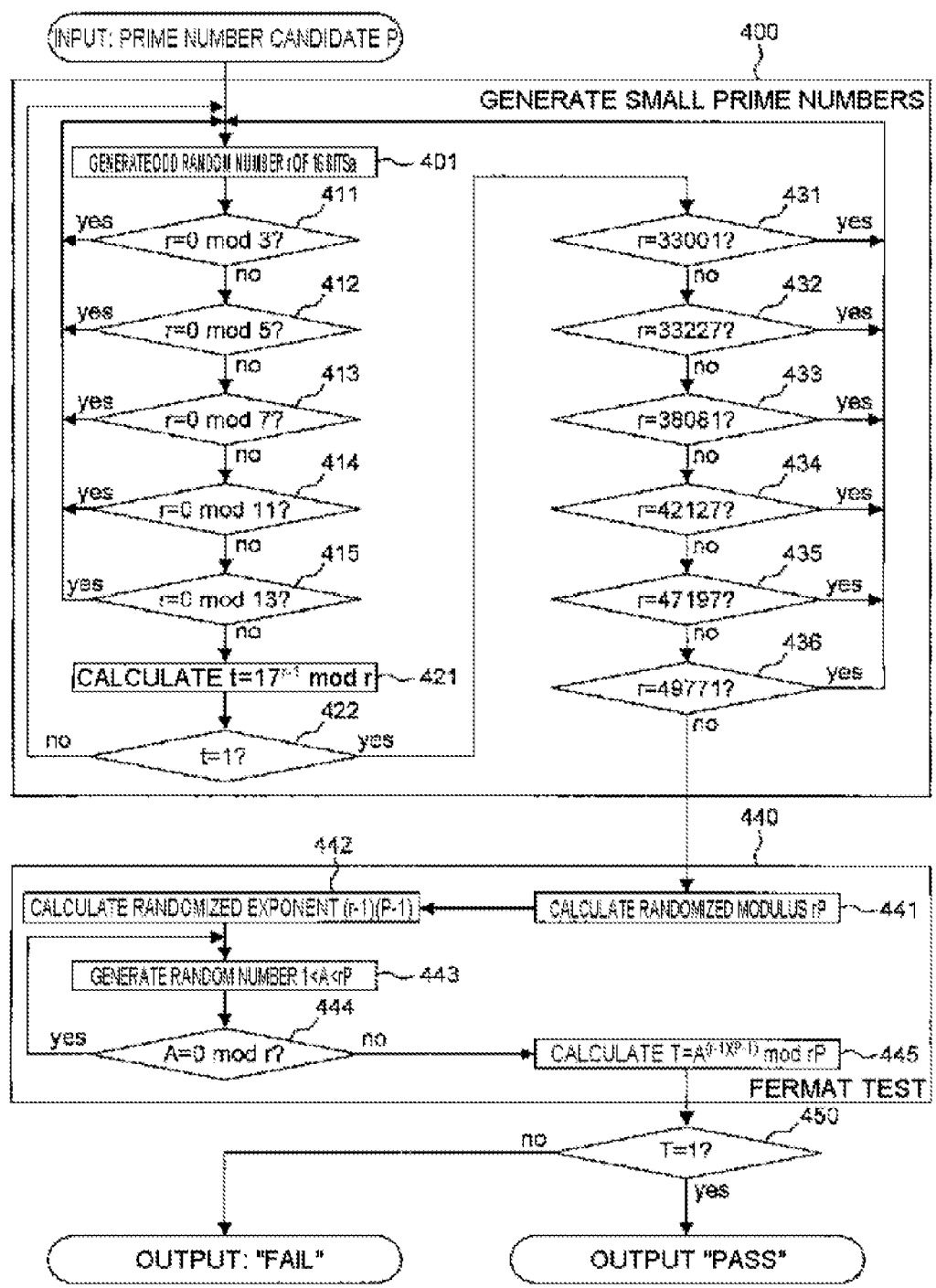
FIG. 6 is a flow chart showing an operation example of the semiconductor device for carrying out primality determination of a prime number candidate shown in FIG. 1 or 2.

FIG. 1 shows the block diagram of the semiconductor device according to an embodiment of the present invention, and FIG. 6 is a flow chart showing an operation example thereof. FIG. 6 includes two portions: Step 400 of generating an integer for randomization, i.e., generating a small prime number; and Step 440 of Fermat test. First, the Fermat test (Step 440) is described.

There is provided a semiconductor device including the random number generator 1, the modulus generator 2, the exponent generator 3, the power residue calculating unit 4, and the determination unit 5, and determining primality of the input prime number candidate P, in which each component carries out the following operation.

The random number generator 1 generates the first random number as the randomizing number r, and the modulus generator 2 generates the product rP of the prime number candidate P and the randomizing number r as the first integer R1 (Step 441), and the exponent generator 3 generates a product (r−1) (P−1) of a number obtained by subtracting one from the prime number candidate P and a number obtained by subtracting one from the randomizing number r, as the second integer R2 (Step 442).

The power residue calculating unit 4 sets the first integer R1 to the modulus, sets the second integer R2 to the exponent, and sets the random number A larger than one and smaller than rP to the base (Step 443), and carries out the residue calculation of Expression (6) below (Step 445).

$$A^{(r-1)(P-1)} \bmod rP \qquad (\text{Exp. 6})$$

The determination unit 5 determines the primality of a prime number candidate. More specifically, when the calculation result of the power residue calculating unit is one, "Pass" is output, while when it is other than one, "Fail" is output (Step 450).

Thus, both the modulus and exponent of the power residue calculation in the Fermat test are randomized, and therefore the power consumption of the semiconductor device for carrying out power residue calculation becomes independent of the value of the prime number candidate, and as a result, leakage of a prime number at the time of primality determination is prevented.

Here, the base A can be arbitrarily selected among random numbers larger than one and smaller than rP, but by setting the base A to an integer other than a multiple of the randomizing number r (Step 444), the probability of being determined as the error of false negative can be reduced. The reason therefor is described later.

The principle of the above-described Fermat test with the randomized exponent and modus is now described.

If the randomizing number r is a prime number and P is also a prime number, then $$\phi(rP)=(r-1)(P-1) \qquad (\text{Exp. 7})$$

Here, 9 is the Euler function.

If any integer A (1<A<rP) satisfying Expression (8) described below is set to the base, Euler's theorem (Exp. 1) is established as Expression (9) below. Here, GCD(X,Y) is a function to calculate the greatest common divisor of an integer X and an integer Y.

$$GCD(A,rP)=1 \qquad (\text{Exp. 8})$$

$$A^{(r-1)(P-1)}A^{\phi(rP)}=1 \bmod rP \qquad (\text{Exp. 9})$$

Accordingly, by determining whether the power residue $A^{(r-1)(P-1)}$ mod rP is one or not, the primality of the prime number candidate P can be determined.

However, the Fermat test is originally a probabilistic prime number determination method, and theoretically has the probability that an error occurs in determination. Errors include false negative and false positive. The error of false negative is a case where the prime number candidate P is determined as "Fail" although it is a prime number, while the error of false positive is a case where the prime number candidate P is determined as "Pass" although it is not a prime number.

In the ordinary Fermat test, the error of false negative does not occur, while in the randomized Fermat test, the error of false negative might occur when A and rP are in a relation not relatively prime to each other. However, false negative is not a serious problem. This is because in an algorithm for searching a prime number, several valid candidates are just erroneously discarded and it merely takes extra time to search.

The error of false positive occurs in the case where when P is not a prime number, $\phi(rP) \neq (r-1)(P-1)$ but $(r-1)(P-1)$ and $\phi(rP)$ have a common divisor d, and furthermore a specific A satisfies $A^d=1$ mod rP, and thus $A^{(r-1)(P-1)}=1$ mod rP. This is the reason why primality determination methods, such as the Fermat test and the Miller-Rabin test, are called "probabilistic". In order to overcome the problem of false positive, for example, methods, such as a method of repeating determination using different bases A or a method of combining a plurality of different determination methods, are known to be effective.

The error of false positive may occur even in the ordinary primality determination method, but false negative is the problem specific to the determination method with randomization. As stated before, the error of false negative is not a serious problem and does not affect the accuracy of determination result. However, for the purpose of improving the performance of the algorithm for prime number search, the error of false negative is preferably prevented.

In the embodiment, by setting the base A to an integer other than a multiple of the randomizing number r (A mod r≠0) (Step 444), the error of false negative is prevented. When A mod r=0, a new A is selected. When both r and P are prime numbers, GCD (A,rP)=GCD (A,r)GCD(A,P) is established, as known from the characteristic of the greatest common divisor. In addition, because r is a prime number, there can be only two cases: GCD (A,r)=1 or GCD(A,r)=r. GCD(A,r)=r is obtained only when A is divisible by r, i.e., only when A=0 mod r is established. Accordingly, by setting the base A to an integer other than a multiple of the randomizing number r (A mod r≠0) (Step 444), it can be guaranteed that A and rP are relatively prime to each other and the error of false negative can be eliminated.

In the embodiment, furthermore, a small prime number is generated and set to a randomizing number (Step 400). This is not the indispensable requirement, but by employing this step, the probability that A and rP are in a relation relatively prime to each other is increased, the probability that the error of false negative occurs is reduced, and at the same time the probability that the error of false positive occurs is also reduced. Moreover, there is also an effect that in the above check of A mod r≠0 (Step 444), the number of branches is reduced, in which A does not satisfy the conditions and a new A is selected.

[Variant 1 of Embodiment 2] <Randomization by a Small Prime Number>

In the above-described Embodiment 2, it is pointed out that by setting the randomizing number r to a prime number, the probability of erroneous determination can be reduced and the reliability can be improved. The present invention is originally intended to determine primality, and therefore requesting a prime number as the input appears to be self-contradictory. However, a number targeted for primality determination is typically a large prime number of the number of bits equal to or greater than 512 bits, while a prime number required for randomization ends up with a small prime number of approximately 16 bits. A method of generating a prime number of 16 bits as the randomizing number r is described using FIG. 6. However, this technical idea is not limited to 16 bits, but can be extended also to the generation of a prime number of a larger number of bits.

FIG. 6 includes two portions: Step 400 of generating an integer for randomization, i.e., generating a small prime number; and Step 440 of the Fermat test.

In Step 401, an odd random number r of 16 bits is generated. In Steps 411, 412, 413, 414, and 415, the divisibility of r by small prime numbers 3, 5, 7, 11, and 13 less than the predetermined number 17 is confirmed. When r is divisible by the small prime numbers, a new random number is generated in Step 401. When r is not divisible by the small prime numbers 3, 5, 7, 11, and 13, the Fermat test with the predetermined number 17 as the base is executed in Step 421. More precisely, the power residue $17^{r-1}$ mod r is calculated. When the result is not one, a new random number is generated in Step 401. When the result is one, comparisons of 33001, 33227, 38081, 42127, 47197, and 49771 with r are carried out in Steps 431, 432, 433, 434, 435, and 436. When r differs from the above numbers, it is confirmed that r is a prime number, and r is output to the next Fermat test (Step 440). Otherwise, a new random number is generated in Step 401.

The reason why the divisibility of r by small prime numbers is confirmed prior to the power residue calculation (Steps 411-415) is that by removing the numbers, which can be easily determined as not a prime number, in advance, the number of times of power residue calculation having a large calculation load is reduced.

The reason why it is confirmed that r is not any one of the six integers in Steps 431-436 is as follows. The Fermat test is a probabilistic prime number determination method as described above and therefore satisfies the power residue $17^{r-1}$ mod r=1, but there is an integer r that is not a prime number. Such integers of 16 bits are only the above six integers 33001, 33227, 38081, 42127, 47197, and 49771.

As described above, it is mathematically guaranteed that an integer of 16 bits, which is not divisible by the prime numbers 3, 5, 7, 11, and 13 less than the predetermined number 17, satisfies the power residue $17^{r-1}$ mod r=1, and is also not the six integers 33001, 33227, 38081, 42127, 47197, and 49771, is a prime number.

The scope of the invention disclosed in this specification is not limited to the specific method of generating a small prime number. To those skilled in the art, it is clear that the technique described in the embodiment easily extends to prime numbers having a different bit length. Moreover, it is clear that a small prime number can be generated by various approaches, such as alternative small primality determinations of such as a test with a different base, the Miller-Rabin test, and the Solovay-Strassen test, or small prime numbers can be selected directly from a table of small prime numbers stored in a memory.

By using a number, which is guaranteed to be a prime number, as the randomizing number r, the probability that the error of false negative or false positive occurs can be reduced, and the efficiency of primality determination can be improved.

[Operation Example of Embodiment 2]

The operations of the integer generation for randomization generating small prime numbers (Step 400) and of the Fermat test (Step 440) of Embodiment 2 described above are described with specific numerical values illustrated. Although in RSA encryption a prime number of 512 bits or more is preferably used, the primality determination of an integer of 256 bits will be illustrated for ease of understanding.

A first prime number candidate P=0xd69cb0535ebbe48312596ae3ba8ca2f5 is input.

First, a small prime number r is generated as the randomizing number r (Step 400).

An odd random number of 16 bits is generated. r=45643=0xb24b (Step 401).

Because r=1 mod 3 (Step 411), r=3 mod 5 (Step 412), r=3 mod 7 (Step 413), r=4 mod 11 (Step 414), r=0 mod 13 (Step 415), and r=0 mod 13, r is not a prime number.

A new random number is generated. r=22703=0x58af (Step 401).

Because r=2 mod 3 (Step 411), r=3 mod 5 (Step 412), r=2 mod 7 (Step 413), r=10 mod 11 (Step 414), and r=5 mod 13 (Step 415), r is not divisible by any of the small prime numbers 3, 5, 7, 11, and 13.

When the power residue with the base of 17 is calculated (Step 421), T=$17^{r-1}$ mod r=20245. Therefore, r fails in the Fermat test with the base 17 (Step 422), thus revealing that r is not a prime number.

Furthermore, a new random number is generated. r=47797=0xbab5 (Step 401).

Because r=1 mod 3 (Step 411), r=2 mod 5 (Step 412), r=1 mod 7 (Step 413), r=10 mod 11 (Step 414), and r=12 mod 13 (Step 415), r is not divisible by any of the small prime numbers 3, 5, 7, 11, and 13.

When the power residue with the base of 17 is calculated (Step 421), T=$17^{r-1}$ mod r=1. Therefore, r passes the Fermat test with the base 17 (Step 422).

Because r differs from 33001, 33227, 38081, 42127, 47197, and 49771 (Steps 431-436), 47797 is determined as a prime number. This is set to the randomizing number r and the process proceeds to Step 440 of the Fermat test.

When the randomized modulus is calculated (Step 441), rP=0xbab5×0xd69cb0535ebbe48312596ae3ba8ca2f5 and rP=0x9c8594e53dc67edfcc00f0e2088d13 d53939 are obtained.

When the randomized exponent is calculated (Step 442), (r−1)(P−1)=0xbab4× 0xd69cb0535ebbe48312596ae3ba8ca2f4 and (r−1)(P−1)= 0x9c84be488d732023e77dde889da95947 db90 are obtained. A random number is generated and set to the base A (Step 443).

When it is determined whether or not the base A=0xef9273ffcbf07692b8ae10dfc282824556f is not divisible by r (Step 444), A mod r=0xef9273ffcbf07692b8ae10dfc282824556f mod 0xbab5=0x84ac and it is known that the base A is not divisible by r. Randomized power residue calculation $A^{(r-1)(P-1)}$= 0x49fd654061ce69 cc0278cd67a1a3b414dac0 mod rP can be carried out.

Because the result is not one, it is known that the prime number candidate P is not a prime number, and the prime number candidate P is incremented.

A new candidate is P=0xd69cb0535ebbe 48312596ae3ba8ca2f7.

For the randomizing number r, a new odd random number of 16 bits is generated. r=50207=0xc41f (Step 401).

Because r=2 mod 3 (Step 411), r=2 mod 5 (Step 412), r=3 mod 7 (Step 413), r=3 mod 11 (Step 414), and r=1 mod 13 (Step 415), r is not divisible by any of 3, 5, 7, 11, and 13.

When the power residue with the base of 17 is calculated (Step 421), T=$17^{r-1}$ mod r=1. Therefore, r passes the Fermat test with the base 17 (Step 422).

Because r differs from 33001, 33227, 38081, 42127, 47197, and 49771 (Steps 431-436), 50207 is determined as a prime number. This is set to the randomizing number r and the process proceeds to Step 440 of the Fermat test.

When the randomized modulus is calculated (Step 441), rP=0xc41f×0xd69cb0535ebbe48312596ae3ba8ca2f7 and rP=0xa469f3f92ea053b505ebaeaa4c6743 ccd7e9 are obtained.

When the randomized exponent is calculated (Step 442), (r−1)(P−1)=0xc41e×0xd69cb0535ebbe48312596a e3ba8ca2f6 and (r−1)(P−1)=a4691d5c7e4cf4f92168 9c50e183893f70d4 are obtained. A random number is generated and set to the base A (Step 443).

When it is determined whether or not the base A=0x6079d470762925c9d0382d34d776548a891e is not divisible by r (Step 444), A mod r=0x6079d470762925c9d0382d34d776548a891e mod 0xc41f=0x96c8 and it is known that the base A is not divisible by r. Because the result of power residue calculation $A^{(r-1)(P-1)}$=1 mod rP (Step 445) is one, it can be determined as "Pass" (Step 450).

In this example, the prime number candidate P=0xd69cb0535ebbe48312596ae3ba8ca2f7 is actually a prime number.

[Hardware Configuration Example of Embodiment 2]

Figure 3:
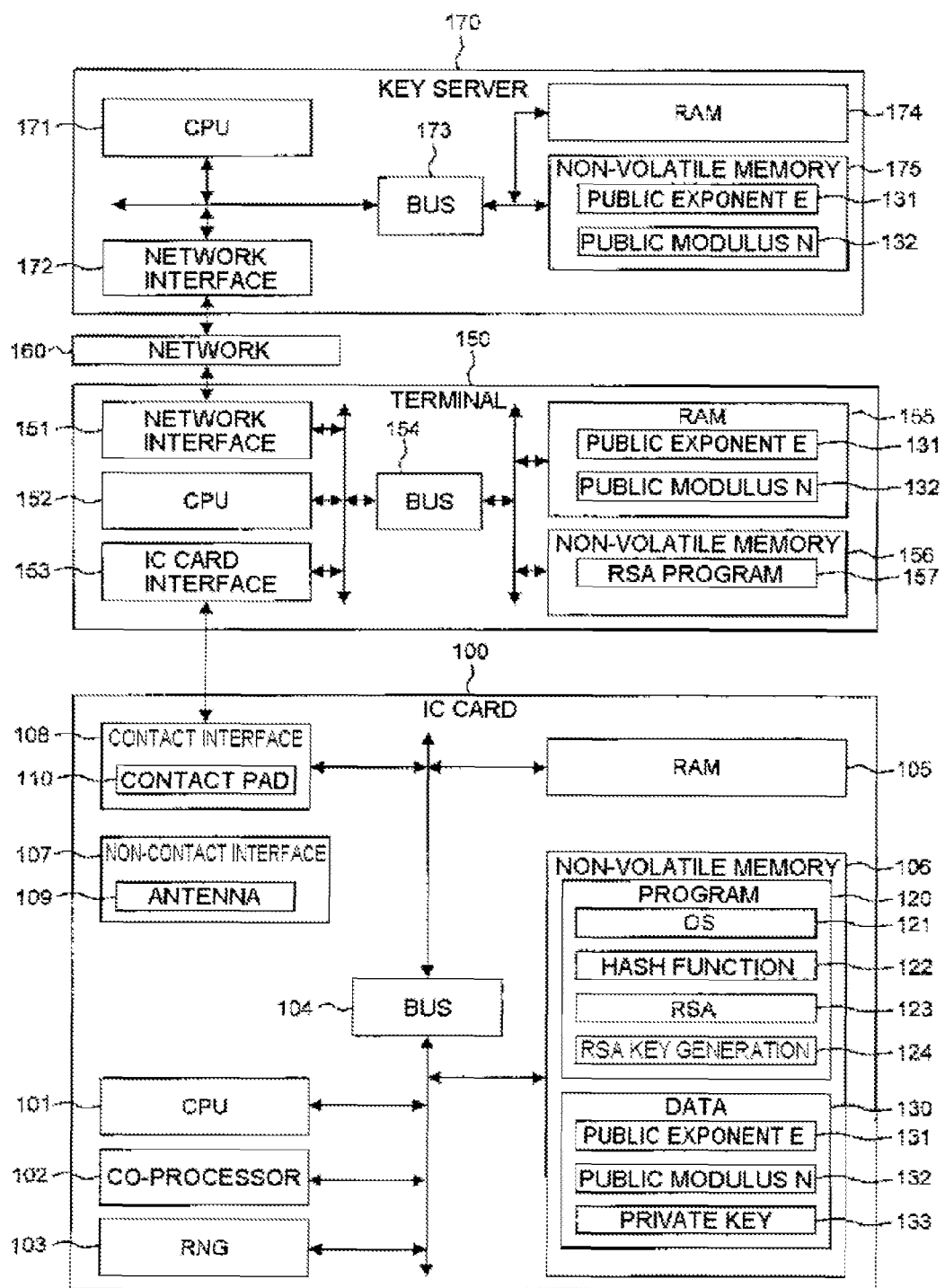
FIG. 3 is a block diagram illustrating an IC card, which is an example of the semiconductor device according to an embodiment of the present invention, and a system in which this IC card is utilized.

FIG. 3 is a block diagram illustrating an IC card, which is an example of the semiconductor device according to the embodiment, and a system in which this IC card is utilized.

The IC card has many possible applications. In the embodiment, an example of use of the IC card is described, such as when a customer purchases a product at a store using an IC card 100. A sales person has an IC card terminal 150. The IC card terminal 150 can handle transactions coming from the IC card, and is linked to a key server 170, which a bank owns, via a network 160. In practice, the system shown in FIG. 3 may include many IC cards, which different customers own, and/or many terminals related to different stores. The key server may be linked to a terminal, which is used in order to register an IC card after the IC card is issued to a customer of a bank.

The IC card includes hardware modules, such as a central processing unit (CPU) 101, a coprocessor 102 capable of calculating a residue (A mod C), multiplication (A×B), modular multiplication (A×B mod C), power residue ($A^B$ mod C), and the like at high speed, a random number generator (RNG) 103, a RAM 105, and a non-volatile memory 106. The calculations to be executed can be designed so as to be executable at high speed by the coprocessor. On the other hand, the IC card can be also designed so as to be executed by the software of the CPU, and when the required speed performance is low, an IC card without the coprocessor can be also realized.

The hardware module inside the IC card 100 is coupled to a bus 104.

The IC card can be linked to other device via a contact pad 110 of a contact interface 108 or via an antenna 109 of a non-contact interface 107. For the contact interface 108 and the contact interface 107, inclusion of either one would be sufficient, but both may be included. When both are included, these can be complementarily operated.

A program 120 and data 130 are stored into the non-volatile memory 106. The data 130 includes an RSA encryption public exponent E131, an RSA encryption public modulus N132, and an RSA encryption private key D133. The program 120 includes an IC card OS 121, a hash function program 122, an RSA encryption program 123, and an RSA encryption key generation program 124. All the programs are executed by the CPU 101, and the intermediate results are stored into the RAM 105. The RSA encryption program 123 calculates an RSA signature of an input M as S=H(M)$^D$ mod N (Exp. 10) using the hash-function program 122, the private key D133, and the public modulus N132. Here, H(M) is the hash function. This power residue is calculated by the coprocessor 102.

The terminal 150 includes a network interface 151, a CPU 152, an IC card interface 153, a RAM 155, and a non-volatile memory 156. The hardware module of the terminal is linked through a bus 154. The RAM stores the public exponent E131 and the public modulus N132 of the IC card acquired from the key server 170. The non-volatile memory 156 includes the RSA program 157 executed by the CPU 152, and the intermediate results are stored into the RAM 155. The RSA program 157 calculates S$^E$ mod N, and verifies the signature S, which is issued by the IC card, by comparing the result with H(M).

The key server 170 includes a CPU 171, a network interface 172, a RAM 174, and a non-volatile memory 175 storing the public exponent E131 and the public modulus N132 of the IC card. The key server and the terminal are linked via the network 160.

Figure 4:
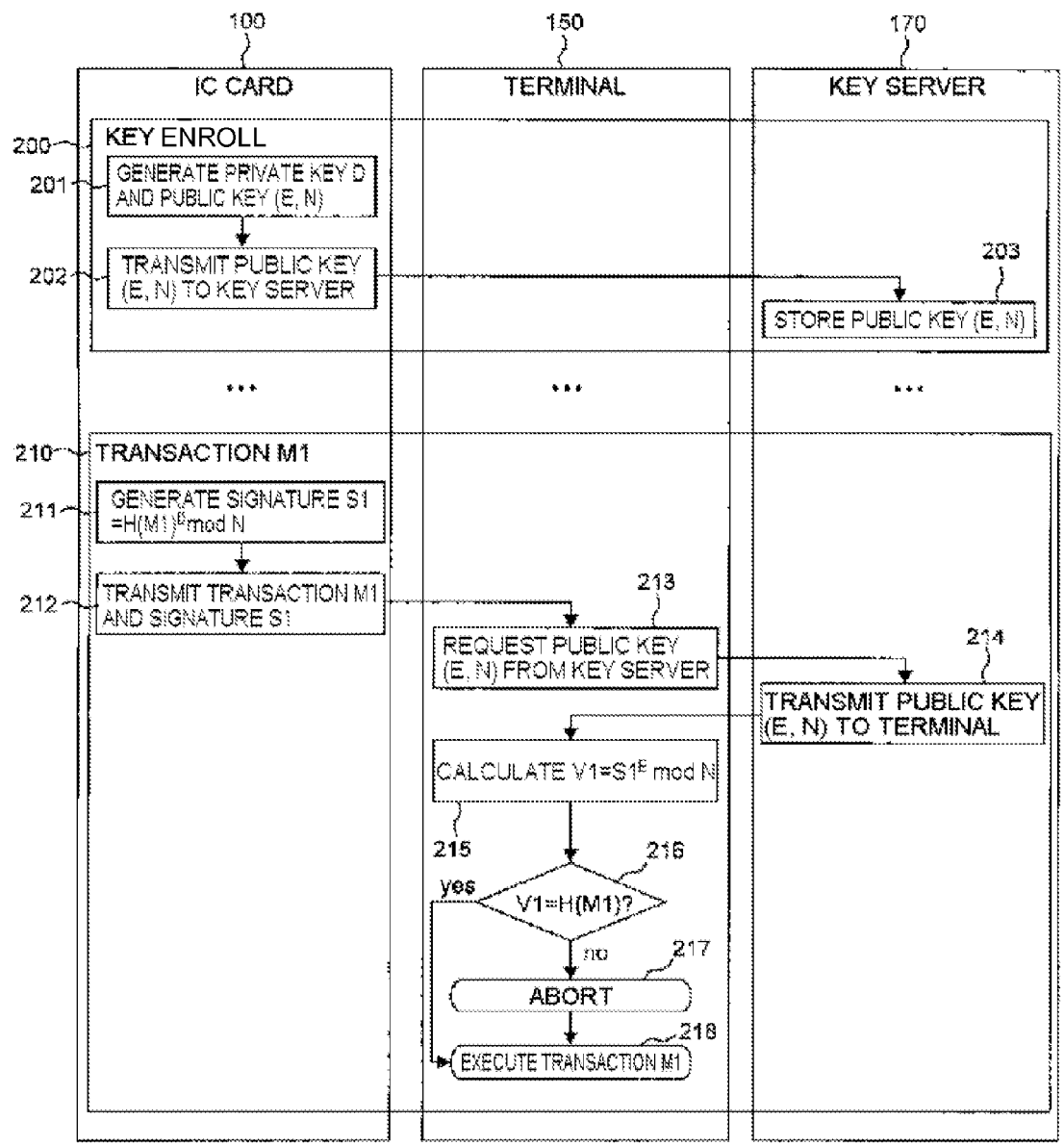
FIG. 4 shows a typical interaction between the IC card, a terminal, and a key server when RSA transactions are carried out by the system illustrated in FIG. 3.

[Example of RSA Transaction of Embodiment 2]
The RSA transaction in this system is described referring to FIG. 4.

FIG. 4 shows a typical interaction among the IC card 100, the terminal 150, and the key server 170 when the RSA transaction is carried out by the system illustrated in FIG. 3.

Enrollment (Step 200) is carried out at the beginning of a life cycle. After the IC card 100 is issued, the RSA encryption public modulus N132 and the RSA encryption private key D133 are generated from the RSA encryption public exponent E131 by the IC card using the RSA encryption key generation program 124. The RSA encryption public key includes a public exponent and a public modulus, and is stored into the non-volatile memory 175 of the key server 170 in Step 203. In the enrollment step, the IC card and the key server are linked through the IC card terminal that merely transfers communications without carrying out an active role. Note that, in this scenario, the RSA encryption key is generated inside the IC card. The private key is advantageous in terms of security because it will not leave the IC card. This is because if the private key is generated by the key server, the system will have a single point of failure and could compromise the key server and thereby leak the enrolled private keys of all the IC cards.

Once an IC card is enrolled, the IC card can be used by a terminal for carrying out transactions. For example, transaction 210 indicated by an electronic message M1 is considered. This transaction is signed by the IC card using an RSA encryption system. The signature is the power residue $S1=H(M1)^D \bmod N$ (Exp. 11). Here, H(M1) is a hash value of M1 calculated by the hash function program 122, D is an RSA encryption private key 133, and N is a public modulus 132. The RSA signature is calculated by the RSA encryption program 123 using the coprocessor 102 for power residue calculation.

In order to verify the RSA signature S1, the terminal requires the public key of the IC card. This public key is acquired from the key server 170, and stored into the RAM 155 of the terminal. The key server serves as a reliable engine for proving the reliability of the public exponent E and the public modulus N. Next, the terminal verifies the signature. In Step 215, a value $V1=S1^E \bmod N$ (Exp. 12) is calculated using the RSA program 157 executed by the CPU 152. V1 is compared with the hash value H(M1) of the transaction M1 in Step 216. If the values are equal, the transaction M1 is carried out. Due to the characteristic of the RSA encryption system, $(H(M)^D)^E=H(m) \bmod N$ (Exp. 13). Accordingly, the terminal accepts the reliable signature.

Similarly, more transactions can be carried out, the same IC card can be used by a different terminal, and the same terminal can handle the transactions coming from the different IC card.

A more realistic example of use is introduced below.

A customer A has a smart phone provided with a mobile settlement function through a non-contact interface. The mobile settlement function is managed by B Company. First, the customer A operates the software of the smart phone to generate an RSA encryption private key D and public key (E,N). Because the generation of the private key D is carried out by the customer A himself/herself, it is guaranteed that anyone except the customer A cannot know the private key. Subsequently, the customer A transfers the generated public key to a key server owned by B Company. At this time point, the enrollment is completed, and the customer A can carry out the mobile settlement using the smart phone.

Suppose the customer A visits a C store dealing with the mobile settlement which B Company manages. The C store issues a bill M1 which the customer A signed by means of the smart phone (Step 211). Here, the signature is $S1=H(M1)^D \bmod N$. The C store downloads the public key (E,N) of the customer A from the key server of B Company (Steps 213 and 214) and checks the signature S1 (Steps 215 and 216). If the signature is authentic, the payment is authenticated (Step 218). At a later date, this purchase price at the C store is charged from B Company to the customer A.

In the foregoing, the example described referring to FIGS. 3 and 4 describes one possible application system of the RSA signature, and the scope of the present invention is not limited to a specific implementation of the system.

[Example of RSA Encryption Key Generation of Embodiment 2]

Figure 5:
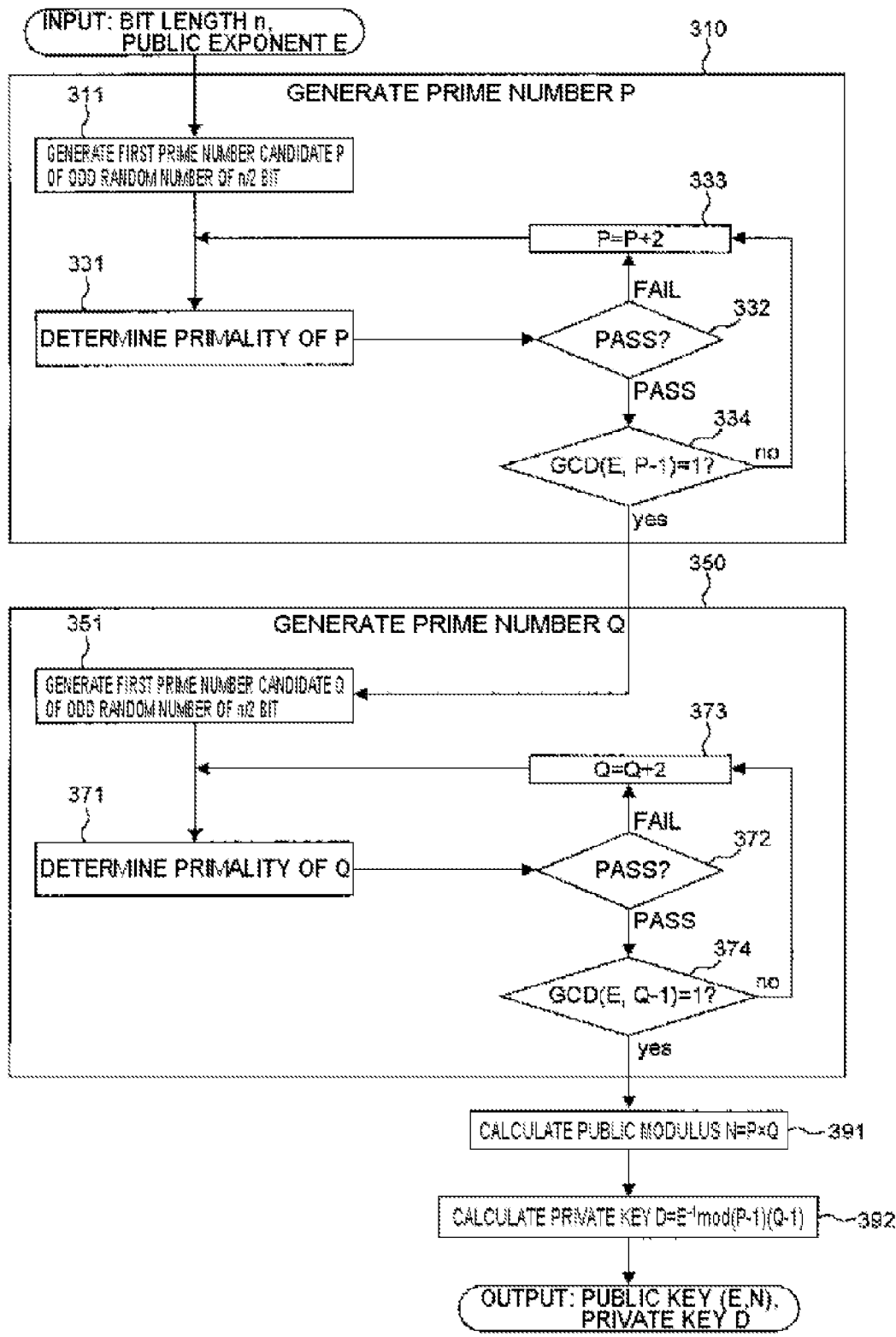
FIG. 5 is a flow chart illustrating an implementation example of a software for generating an RSA encryption key using the semiconductor device for carrying out primality determination according to the present invention.

An example of the RSA encryption key generation of Embodiment 2 is described referring to FIG. 5.

FIG. 5 is a flow chart illustrating an example of the implementation of a software for generating the RSA encryption key using the semiconductor device for carrying out the primality determination according to the present invention.

The generation of a public key and a private key (Step 201) is described in detail below. A pair of the RSA encryption keys has the public key (E,N) and the private key D. E represents a public exponent and N represents a public modulus. Depending on the implementation of the RSA encryption, a private key may have several integers, but this alternative definition of the private key does not affect the invention described in this patent, and therefore the description of the private key consisting of several integers is omitted.

An RSA encryption key generation algorithm uses the public exponent E131 and a bit length n as input parameters. For example, for the reason of efficiency, $2^{16}+1$ is often selected as E, but other selection is possible. The bit length must be selected so that factoring attack may not be possible. For example, a bit length longer than 1024 bits is considered to be safe. The RSA encryption key generation algorithm generates two prime numbers P and Q in Steps 310 and 350, and calculates the public modulus $N=P \times Q$ in Step 391 and the private key D in Step 392. In the case of the alternative definition of the private key, only Step 392 is affected.

Hereinafter, the generation of the prime number P (Step 310) is described in detail. The description of the generation of Q (Step 350) is omitted because it is basically the same as P. First, in Step 311, an odd random number integer P of a bit length n/2 is generated using the RNG 103. Next, in Step 331, the primality determination of P is carried out. In the case of "Fail", P is incremented by +2 (Step 333) and the determination is repeated. In the case of "Pass", the public exponents E131 and the greatest common divisor (GCD) of P are calculated (Step 334). If GCD is not 1, P is incremented by +2 (Step 333) and the determination (Step 331) is repeated. If GCD is one, it is determined that an appropriate prime number P has been found.

Figure 2:
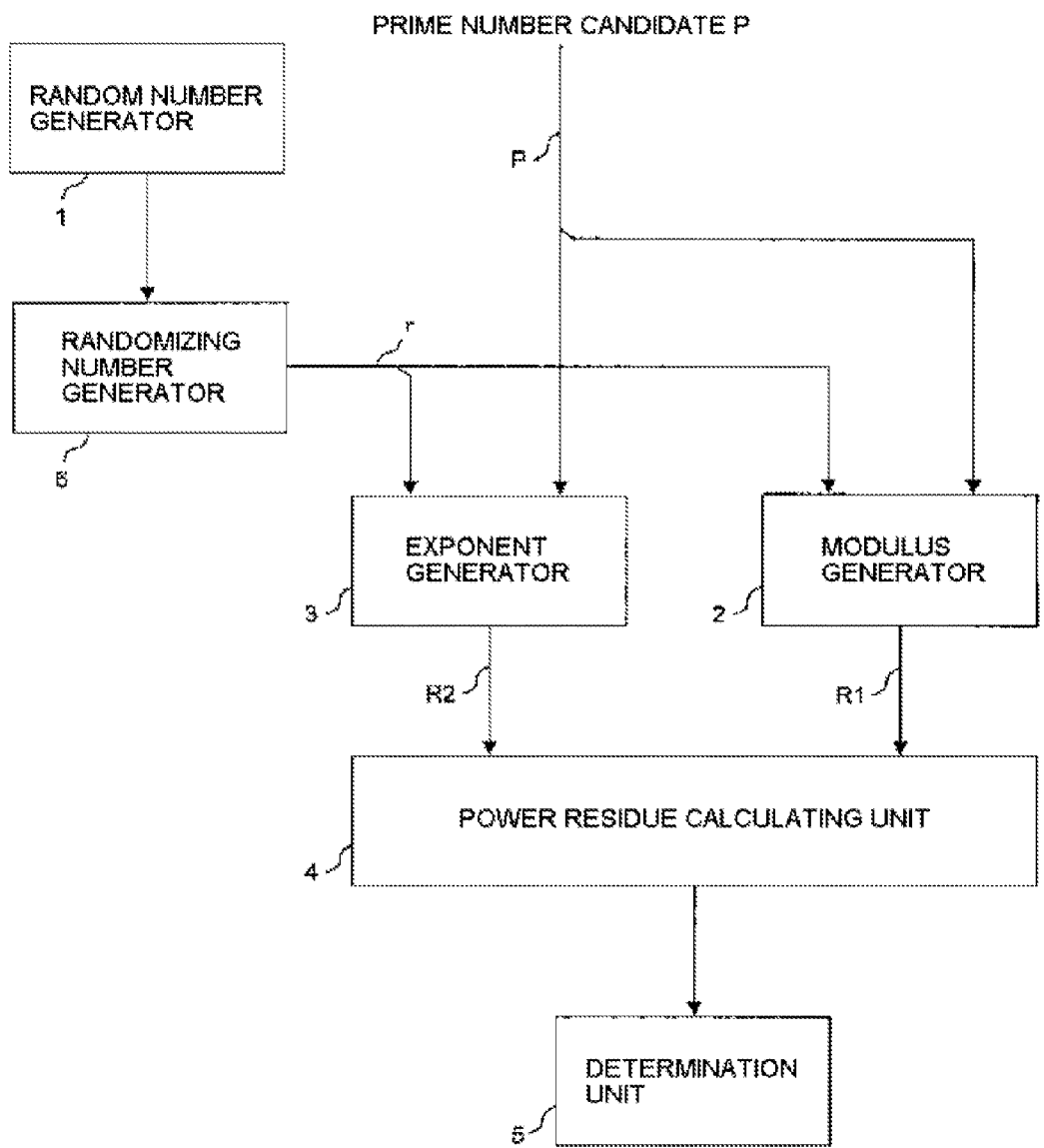
FIG. 2 is a block diagram of a semiconductor device for carrying out primality determination of a prime number candidate, according to an alternative embodiment of the present invention.

The primality determination of Steps 331 and 371 is as already described referring to FIGS. 1, 2, and 3, and is the essential part of the present invention aiming to protect the primality determination from leakage attack.

[Variant 2 of Embodiment 2] <RSA Encryption Key Generation Using a Sieve of Small Prime Numbers>

The RSA encryption key generation technique shown in FIG. 6 needs many calls for primality determination, resulting in many costly power residue calculations to be carried out. In order to reduce the number of times of power residue calculation, a sieving technique is often used. Sieving refers to checking the divisibility of a prime number candidate using the first small prime number. When a prime number candidate is divisible by the small prime number, the prime number candidate is apparently not a prime number and the algorithm can search for the next candidate without carrying out the primality determination.

Figure 8:
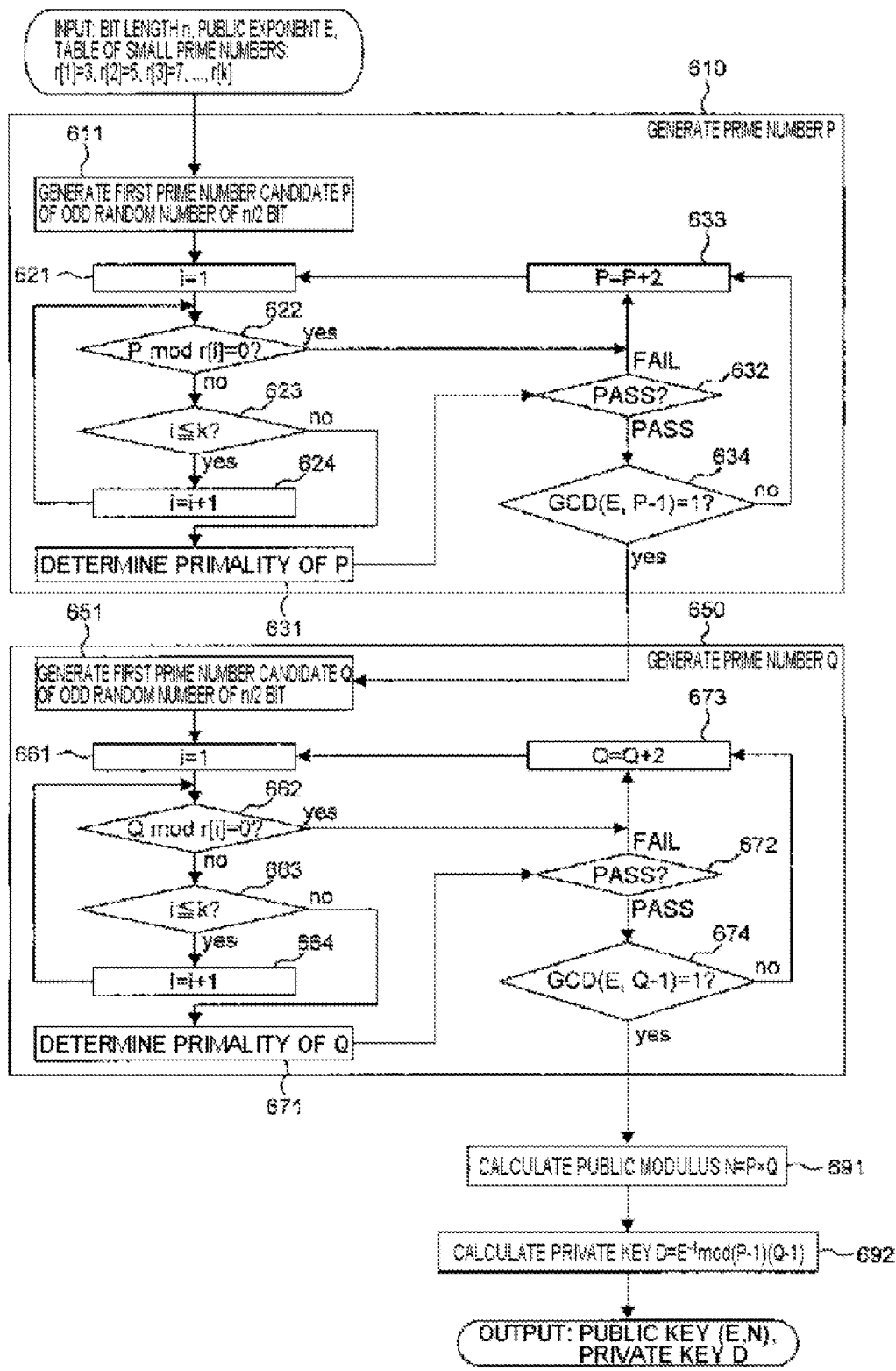
FIG. 8 is a flow chart of RSA encryption key generation using a sieve of small prime numbers.

FIG. 8 is a flow chart of the RSA encryption key generation using the sieve of small prime numbers. The RSA encryption key generation program is the same as the one shown in FIG. 6 except that the divisibility of the prime number candidates P and Q is checked using small prime numbers before the primality determination is carried out in Steps 631 and 671.

A small prime number r[i] stored in the table 534 is sequentially accessed, and P mod r[i] is calculated (Step 622). If the result of any of modular reductions is zero, the candidate is incremented without carrying out primality determination (Step 633). If all the results of modular reductions are not zero, i.e., if a prime number candidate is not divisible by the small prime numbers, the primality determination is carried out in Step 631.

For the prime number candidate Q, similarly, after sieving by small prime numbers is carried out in advance, primality determination 671 can be carried out.

Thus, the frequency of costly power residue calculation can be reduced in the primality determination.

The sieving of small prime numbers is not necessarily applied specifically to the embodiment, but can be widely applied to general primality determination. Accordingly, the sieving of a small prime number can be arbitrarily combined also with Embodiments 3 and 4, which are described later, and employed. In particular, in Embodiment 3, a table of small prime numbers needs to be included for other purpose, and therefore when this Variant 2 is combined and employed, a table 534 for sieving small prime numbers can be shared.

Embodiment 3

Randomized Fermat Test Using a Table of Small Prime Numbers

In Embodiment 2, the probability that the error of false negative or false positive occurs can be reduced by setting the randomizing number r to a prime number. To put it the other way around, if a number other than a prime number is set to the randomizing number, the probability that the error occurs will increase. In the embodiment, an embodiment is described in which the Fermat test is randomized by using a randomizing number other than a prime number. A table of small prime numbers is included, and a combination of a randomizing number r1 for randomizing the modulus using this table and a randomizing number r2 for randomizing the exponent is generated. Even if the randomizing numbers r1 and r2 are not prime numbers, if the combination is the one generated while satisfying a certain relationship described below, the Fermat test can be randomized without increasing the probability of the error which the Fermat test theoretically generates.

FIG. 2 is a block diagram of the semiconductor device according to an embodiment of the present invention. There is provided the semiconductor device according to the embodiment including the random number generator 1, the randomizing number generator 6, the modulus generator 2, the exponent generator 3, the power residue calculating unit 4, and the determination unit 5, and determining the primality of the input prime number candidate P, in which each component carries out the following operation.

The random number generator 1 generates a random number sequence (j1, j2, j3, . . . ), and the randomizing number generator 6 generates a randomizing number by prime factor calculation using an integer (t[j]), which is calculated based on the random number sequence, as the exponent.

The modulus generator 2 generates the first integer R1 that is a product of a prime number candidate and a randomizing number, and the exponent generator 3 generates the second integer R2.

The power residue calculating unit 4 carries out power residue calculation, with the first integer R1 as the modulus and the second integer R2 as the exponent, and the determination unit 5 determines the primality of the prime number candidate P based on an output of the power residue calculating unit 4.

Figure 9:
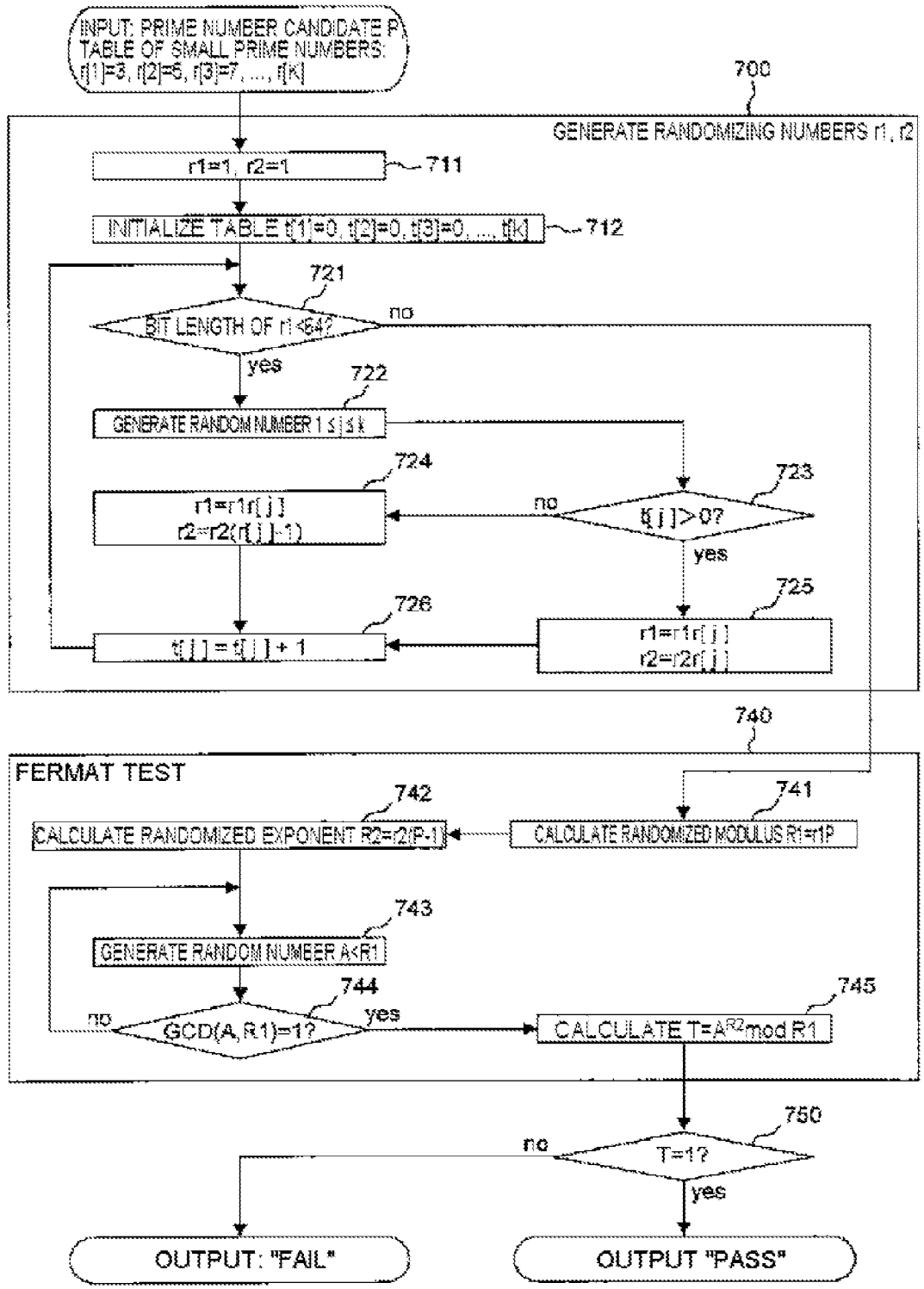
FIG. 9 is a flow chart showing an operation example of the semiconductor device for carrying out primality determination of a prime number candidate shown in FIG. 2.

FIG. 9 is a flow chart showing the operation example, and the flow chart includes two portions of the generation of the randomizing numbers r1 and r2 in Step 700 and the Fermat test in Step 740.

The generation of the randomizing numbers r1 and r2 is described. The semiconductor device according to the embodiment includes a table r[i] of small prime numbers and a table t[i] of the exponents thereof.

In the element of the table r[i] of small prime numbers, prime numbers starting from 3 to the k-th prime number are stored in the ascending order.

$r[1]=3, r[2]=5, r[3]=7, r[k]=$k-th prime number

Essentially, the minimum prime number is 2, but because an odd random number is assumed, 3 is handled as the minimum prime number.

In the table t[i], the exponent of each i-th prime number is associated and stored. By using this, the randomizing number r1 can be expressed in the form of being factorized into prime numbers as shown in Expression (14) below.

$$r1=r[1]^{t[1]}r[2]^{t[2]}r[3]^{t[3]}\ldots r[k]^{t[k]} \quad \text{(Exp. 14)}$$

For example, when t[1]=4, t[2]=2, and the other t[i]=0, $r1=3^4 \times 5^2 =2025$.

First, r1 and r2 are initialized to one (Step 711), and the elements of the table t[1], t[2], . . . , t[k] are initialized to zero (Step 712).

A random number j that is an integer not less than 1 and not more than k is generated (Step 722).

When the exponent specified by the random number j satisfies t[j]=0, i.e., when the prime number r[j] does not exist in the prime factors of the randomizing number r1, r1 is multiplied by r[j] and set to a new r1 and r2 is multiplied by r[j]−1 and set to a new r2, thereby updating r1 and r2, respectively (Step 724).

On the other hand, when the exponent specified by the random number j satisfies t[j]>0, i.e., when the prime number r[j] exists in the prime factors of the randomizing number r1, r1 is multiplied by r[j] and set to a new r1 and r2 is multiplied by r[j] and set to a new r2, thereby updating r1 and r2, respectively (Step 725).

In either case, t[j] is incremented by +1 (Step 726).

The loop constituted by Steps 722 to 726 described above is repeated until the bit length of r1 exceeds a predetermined length (64 bits in the example of FIG. 9).

If the bit length of r1 exceeds 64 bits, the Fermat test is carried out in Step 740. The modulus r1 of the power residue is calculated by multiplying the prime number candidate P by r1 (Step 741). The exponent r2 of the power residue is calculated by multiplying P−1 by r2 (Step 742). Both the randomizing numbers r1 and r2 are random numbers because these are calculated based on the random number j. Both the modulus R1 and the exponent R2 of power residue calculation are randomized because these are calculated by multiplying the randomizing numbers r1 and r2 that are random numbers, respectively.

Next, the base A of power residue calculation is generated as a random number (Step 743), and it is determined whether the greatest common divisor of A and R1 is 1 (Step 744). If the greatest common divisor of A and R1 is not 1, a new base A is generated (Step 743), while if the greatest common divisor of A and R1 is 1 (A and R1 are relatively prime to each other), the power residue calculation of Expression (15) below is executed (Step 745).

$$T = A^{R2} \bmod R1 \quad \text{(Exp. 15)}$$

As the result of power residue calculation, if T=1, it is determined as "Pass", while if T≠1, it is determined as "Fail" (Step 750).

The principle of the above-described Fermat test with randomized exponent and modulus is now described.

Generally, for any integers a and b satisfying GCD(a,b)=1, the Euler function has the following characteristic.

$$\phi(ab) = \phi(a)\phi(b) \quad \text{(Exp. 16)}$$

Here, $\phi$ is the Euler function and GCD(a,b) is the function to calculate the greatest common divisor of the integer a and the integer b.

When r[j] is a prime number and t[j] is an integer equal to or greater than 1, $$\phi r[j]^{t[j]} = (r[j]-1) r[j]^{t[j]-1} \quad \text{(Exp. 17)}$$

In the case of any integer A satisfying GCD(A,R1)=1, Equation (Expression (1)) by Euler's theorem is established, so $$A^{\phi(R1)} = 1 \bmod R1 \quad \text{(Exp. 18)}$$

As a result, when the prime number candidate P is a prime number, r[j] is a prime number and therefore a relationship of Expression (19) below is derived.

$$\phi(R1) = \phi(Pr[1]^{t[1]} r[2]^{t[2]} \ldots r[k]^{t[k]}) = \phi(P) \phi(r[1]^{t[1]}) \phi(r[2]^{t[2]}) \ldots \phi(r[k]^{t[k]}) = (P-1)(r[1]-1) R[1]^{t[1]-1} (R[2]-1) r[2]^{t[2]-1} \ldots (r[k]-1) r[k]^{t[k]-1} = R2 \quad \text{(Exp. 19)}$$

Accordingly, if the prime number candidate P is a prime number, GCD(A,R1)=1 and therefore $$A^{R2} = A\phi^{(R1)} = 1 \bmod R1 \text{ is established (Exp. 20).}$$

Based on the above principle, even if both the exponent and the modulus, such as R1 and R2, of the power residue calculation are randomized, the primality determination of the prime number candidate P can be carried out. As described above, it has been proved that this principle is equivalent to the Fermat test as mathematically described in the above principle, and the randomization will not increase the probability that the error of false negative occurs, and the reliability equal to the Fermat test is maintained.

The scope of the invention disclosed in the embodiment is not limited to a specific Fermat test, but easily extends even to other primality determinations, such as the Miller-Rabin test and the Solovay-Strassen test.

An example of generation of the randomizing numbers R1 and R2 is shown below. In this example, a table of small prime numbers is assumed as Expression (21) below. That is, k=5.

$$r[1]=3, r[2]=5, r[3]=7, r[4]=11, r[5]=13 \quad \text{(Exp. 21)}$$

First, R1 and R2 are initialized to one, and t[i] is initialized to t[1]=t[2]=t[3]=t[4]=t[5]=0. In FIG. 9, R1 has been described assuming an algorithm in which the above-described loop is repeated until the bit length of R1 exceeds 64 bits, but here for simplification, the description is made assuming the repetition is stopped when R1 exceeds 16 bits.

FIG. 12 shows the generation process of randomizing numbers based on this algorithm together with a numerical example.

In this algorithm, a random number not less than 1 and not more than 5 is given to j, R1 is multiplied by r[j], and R2 is multiplied by r[j]−1 or r[j], thereby updating t[j]. Because R1 has exceeded 16 bits when R1=317625 is obtained, the flow leaves the loop and R1=317625 and R2=132000 are output. t[i] at this time point is given by Expression (22) below.

$$t[1]=1, t[2]=3, t[3]=1, t[4]=2, t[5]=0 \quad \text{(Exp. 22)}$$

This implies that the randomizing number R1 has been calculated as follows by Expression (14).

$$R1 = r[1]^{t[1]} r[2]^{t[2]} r[3]^{t[3]} r[4]^{t[4]} r[5]^{t[5]} = 3^1 5^3 7^1 11^2 13^0 = 317\,625 \quad \text{(Exp. 23)}$$

Similarly, the randomizing number R2 has been calculated as follows.

$$R2 = (r[1]-1) r[1]^{t[1]-1} \times (r[2]-1) r[2]^{t[2]-1} \times (r[3]-1) r[3]^{t[3]-1} \times (r[4]-1) r[4]^{t[4]-1} \times (r[5]-1) r[5]^{t[5]-1} = (3-1) 3^0 \times (5-1) 5^2 \times (7-1) 7^0 \times (11-1) 11^1 = 132000 \quad \text{(Exp. 24)}$$

[Hardware Configuration Example of Embodiment 3]

Figure 7:
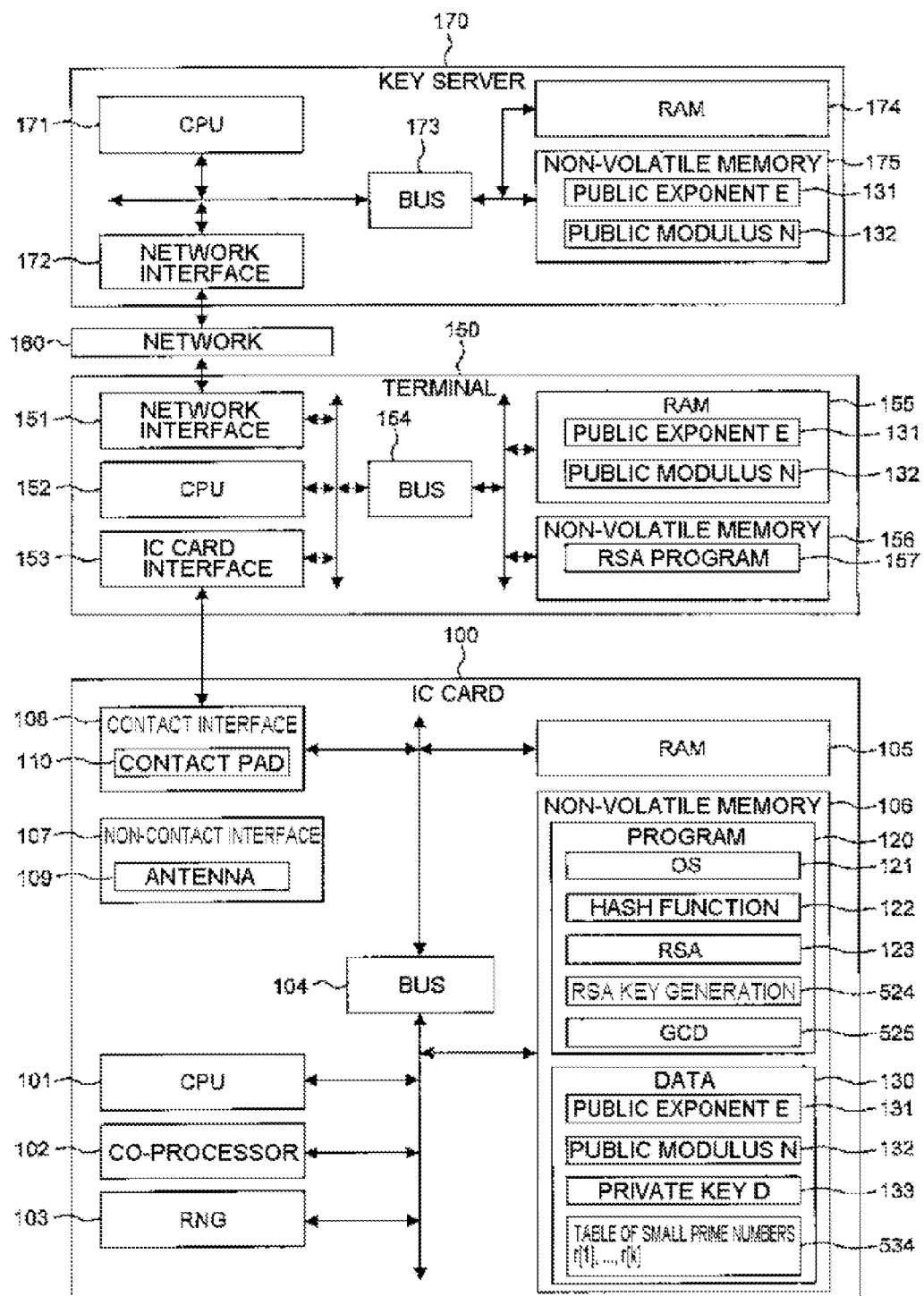
FIG. 7 is a block diagram illustrating an IC card, which is an example of the semiconductor device according to an embodiment of the present invention, and a system in which this IC card is utilized.

FIG. 7 is a block diagram illustrating an IC card, which is an example of the semiconductor device according to the embodiment, and a system in which this IC card is utilized. As compared with the hardware configuration example of Embodiment 2, an RSA encryption key generation program 524 stored in the non-volatile memory 106 differs, and Embodiment 3 differs in that a GCD program 525 for calculating the greatest common divisor is added to the program and also a table 534 of small prime numbers r[1], . . . , r[k] is added to the data, respectively.

The random number j can be generated, for example, by converting based on a random number, which the random number generator RNG 103 outputs, so as to fall in a range of 1 to k. The table t[i] can be stored into the RAM 105 as an intermediate value in order to carry out the algorithm.

The calculation of a power may be speeded up by the coprocessor or the like, or may be realized by the repeated calculation by the CPU.

It is clear that because other portions of the hardware configuration example of Embodiment 3 are the same as those shown in the hardware configuration example of Embodiment 2 (FIG. 3), the same function can be realized, and the example of RSA transaction (FIG. 4) can be also similarly realized.

Embodiment 4

RSA Encryption Key Generation by the Randomized Miller-Rabin Test

As with the Fermat test, the Miller-Rabin test is also a probabilistic primality determination method.

The Fermat test is for stochastic primality determination in the sense that an integer, which has been determined as "Pass" by the Fermat test, is not necessarily a prime number. Even when P is not a prime number (P is a composite number), there is an integer A called a "Fermat Liar" satisfying $A^{P-1}=1$ mod P. To make things worse, in the case of the composite number P called a "Carmichael number", most of the prime numbers smaller than P are Fermat liars.

The Miller-Rabin test is for a well known primality determination, as with the Fermat test, and here the following facts are established.

When P is a prime number, P can pass the Miller-Rabin test in the case of any base A.

When P is not a prime number, the number of the integers A smaller than P that passes the Miller-Rabin test is fewer than P/4.

When the Miller-Rabin test is repeated j times with the base A of a random number, the probability that P is a composite number but can pass the Miller-Rabin test is $1/4^j$ times at most. For example, if the Miller-Rabin test is repeated 25 times, the probability that the composite number P passes the Miller-Rabin test is less than $2^{-50}$.

However, because a prime number is relatively rare, if the Miller-Rabin test is repeated many times in order to reduce the probability of an error, many power calculations are carried out. Moreover, because the exponent and modulus of these power calculations share many bits, all the results become the same. As a result, it is predicted that the leakage attack can reproduce a prime number, which is generated by incremental search, by the Miller-Rabin test.

Embodiment 4 addresses this problem by randomizing both the modulus and the exponent in the Miller-Rabin test.

Figure 10:
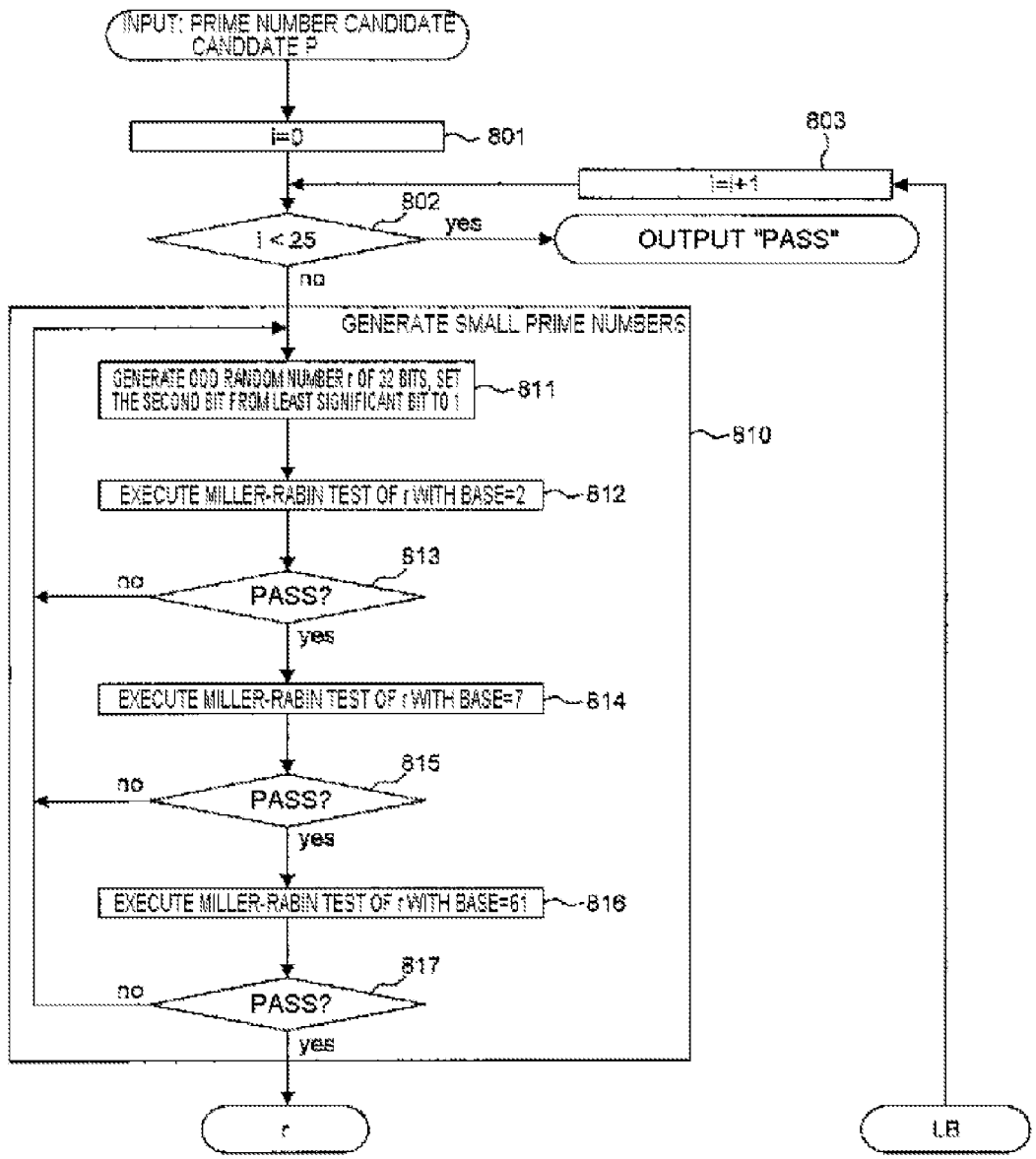
FIG. 10 shows first half steps of generating a small prime number in a flow chart of a randomized Miller-Rabin test according to Embodiment 4.
Figure 11:
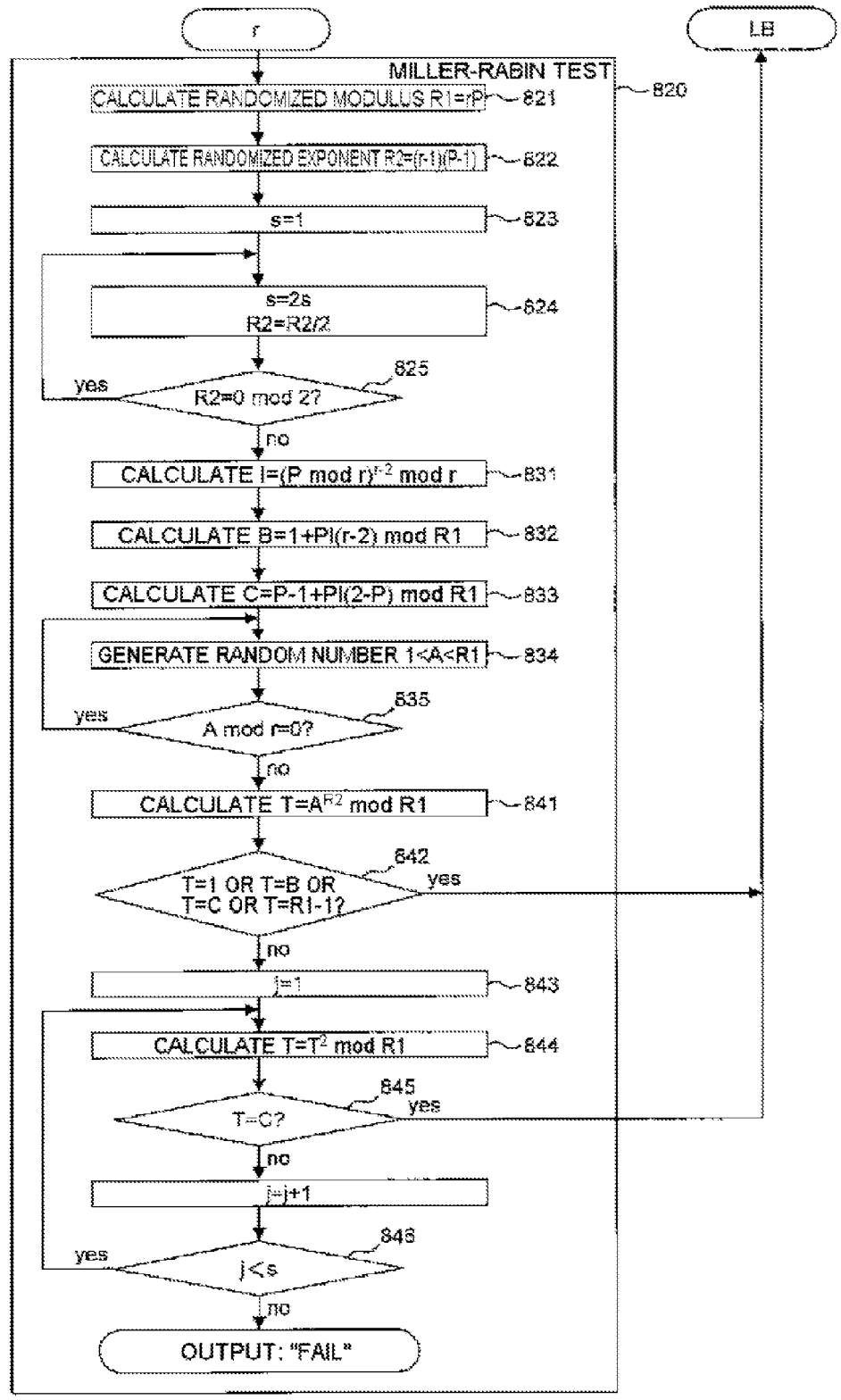
FIG. 11 shows latter half steps of the Miller-Rabin test in the flow chart of the randomized Miller-Rabin test according to Embodiment 4.

FIGS. 10 and 11 are the flow charts of the randomized Miller-Rabin test according to Embodiment 4.

The randomized Miller-Rabin test can be divided into two portions of the generation of a small prime number in Step 810 (FIG. 10) and the Miller-Rabin test in Step 820 (FIG. 11). Steps 810 and 820 are repeated 25 times. If succeeded in 25 times of repetition, it is determined as "Pass".

In the generation of a small prime number in Step 810, a small prime number r of 32 bits whose least significant two bits are 1 is generated. In other words, r=2r'+1, and r' is an odd number. In Step 811, an odd random number of 32 bits is generated, and the second bit from the least significant bit is set to 1. In Steps 812, 814, and 816, the primality determination of the random number r is carried out in the Miller-Rabin test using the bases of 2, 7, and 61. The detail of the Miller-Rabin test is omitted for simplification. There is no composite number of 32 bits that can pass the Miller-Rabin test with the bases of 2, 7, and 61, so if r passes in the determination, it is guaranteed that r is a prime number. If it is determined as "Fail", a new random number is generated in Step 811.

Thus, a small prime number is generated as the randomizing number r, and is sent to the Miller-Rabin test (Step 820).

Step 820 is the randomized Miller-Rabin test, and the modulus R1=rP is calculated in Step 821. In Step 822, the exponent R2=(r−1) (P−1) is calculated, R2 is repeatedly divided by 2 in Step 824 until it becomes an odd number. The number of times being divided "s" is held.

Next, the following numerical values are calculated.

$$I = (P \bmod r)^{r-2} \bmod r = P^{-1} \bmod r \quad \text{(Exp. 25) (Step 831)}$$

$$B = 1 + PI[(r-2) \bmod R1] \quad \text{(Exp. 26) (Step 832)}$$

$$C = P - 1 + PI[(2-P) \bmod R1] \quad \text{(Exp. 27) (Step 833)}$$

B and C are auxiliary values used in the determination of the Miller-Rabin test.

In Step 834, the base A of the random number is generated, and it is determined in Step 835 whether or not the base is divisible by the randomizing number r.

Next, in Step 841, the power residue $T = A^{R2} \bmod R1$ is calculated using the odd randomized exponent R2 and the randomized modulus R1. When the result of the power residue calculation T is one, or the auxiliary value B or C, or R1−1, the next repetition of the Miller-Rabin test is carried out with a new randomizing number r and a new base A.

Otherwise, the following steps are repeated s−1 times. In Step 844, T is updated by $T^2 \bmod R1$, and compared with the auxiliary value C in Step 845. When T is equal to C, the next repetition of the Miller-Rabin test is carried out with the new randomizing number r and the new base A. When T has never been equal to C throughout all the repetitions, the integer P fails in the Miller-Rabin test and is determined as not a prime number.

When it has never been determined as "Fail" through 25 times of repetition of the above steps while changing the randomizing number and the base A using a random number, it is determined as "Pass" (Step 802).

Thus, both the modulus and exponent of the power residue calculation in the Miller-Rabin test are randomized, and therefore the power consumption of the semiconductor device for carrying out power residue calculation becomes independent of the value of the prime number candidate, and as a result, revealing of a prime number at the time of primality determination is prevented.

The principle of the Miller-Rabin test with the randomized exponent and modulus, which has been described so far, is described focusing on the difference from the conventional Miller-Rabin test.

First, the conventional Miller-Rabin test is briefly described.

In the conventional Miller-Rabin test, when the prime number candidate P is given, P−1 is repeatedly divided by 2 until the result becomes an odd number, and the number of times of repetition "s" and an odd number P' are obtained. As a result, a relationship of Expression (28) below is satisfied.

$$P - 1 = 2^s P' \quad \text{(Exp. 28)}$$

Next, the random number A satisfying 1<A<P is generated, and the power residue of Expression (29) below is calculated for primality determination.

$$T = A^{P'} \bmod P \quad \text{(Exp. 29)}$$

If the result is equal to 1 or P−1, it is determined as "Pass", while if it is not equal to either 1 or P−1, the square calculation of Expression (30) below is further repeated s−1 times, and if the result is equal to P−1 at least once, it is determined as "Pass".

$$T = T^2 \bmod P \quad \text{(Exp. 30)}$$

Furthermore, a series of calculations and determinations of Expression (28) through Expression (30) are carried out a predetermined number of times while randomly changing r and A, and after passing in these processes, it is finally determined as a prime number, thereby improving the reliability.

In contrast, in the embodiment, when the prime number candidate P is given, in Steps 824 and 825 the randomized exponent (r−1) (P−1) in place of P−1 is similarly repeatedly divided by 2 to obtain "s" and R2. As a result, a relationship corresponding to Expression (28) is given by Expression (31) below.

$$(r-1)(P-1) = 2^s R2 \quad \text{(Exp. 31)}$$

Next, the base A is generated. Conventionally, a random number satisfying 1<A<P is set to A, but in order to randomize the prime number candidate, in Step 834 a random number satisfying 1<A<R1 is generated as the base A, and in order to add as a condition that the base A is not a multiple of the randomizing number r, Step 835 is carried out.

The condition that the base A is not a multiple of the randomizing number r is equal to GCD (A,R1)=1 when both r and P are prime numbers. Therefore, as with the description in the principle of operation of the Fermat test, this condition is a precondition for deriving the same relationship of Expression (32) below as that of Expression (9).

$$A^{(r-1)(P-1)} = A\phi^{(R1)} = 1 \bmod R1 \qquad \text{(Exp. 32)}$$

Because the power residue calculation of the embodiment aims to randomize the Miller-Rabin test, the randomized R2 is used as the exponent, and therefore as shown in Step 841 and Expression (33) below, the exponent and the modulus of the power residue calculation are replaced.

$$T = A^{R2} \bmod R1 \qquad \text{(Exp. 33)}$$

In the conventional Miller-Rabin test, T is compared with 1 or P−1, while in the embodiment, because P is randomized as R1=rP, an expectation value, which conventionally had two types, 1 or P−1, now has four types. A method of calculating this expectation value is described.

Applying Chinese Residue Theorem, and when T=a mod r and T=b mod P, $$T = b + P[P^{-1} \bmod r], [(a-b) \bmod rP] \qquad \text{(Exp. 34)}$$

As a result, when P is a prime number, the result of the power residue calculation of Step 841 and Expression (33) has the following four cases: in the case of b=1 and a=1, T=1 (Exp. 35): in the case of b=1 and a=−1=r−1, T=1+P($P^{-1}$ mod r) (r−2) mod rP=auxiliary number B (Exp. 36); in the case of b=−1=P−1 and A=1, T=P−1−FP ($P^{-1}$ mod r) (2−P) mod rP=auxiliary number C (Exp. 37); and in the case of b=−1=P−1 and A=−1=r−1, T=rP−1=R1−1 (Exp. 38). Note that, because the above mathematics is a finite field in which the modulus N is specified, −1=N−1 is obtained.

When the result T of the power residue calculation is equal to any one of the above, it is determined as "Pass", while when it does not satisfy any of them, the process proceeds to the next step.

The next step corresponds to s−1 times of repetition of the square calculation of Expression (30) in the conventional Miller-Rabin test.

If one of the results among s−1 times of repetition of the square calculation T=$T^2$ mod R1 (Exp. 39) in Step 844 becomes T=P−1+P($P^{-1}$ mod r) (2−P) mod R1=auxiliary number C (Exp. 40) at least once, it is determined as "Pass" (Step 845).

This is the same as the conventional Miller-Rabin test except that R1 is randomized.

In the embodiment, because r=2r'+1 is guaranteed by a randomizing number obtained by setting the second bit from the least significant bit of a random number of 32 bits to 1 in Step 811, it is known that as the result of the first square calculation in Step 845, a=T mod r=1. Accordingly, as shown in Step 845, T must be compared with the auxiliary number C, not with P−1.

[Hardware Configuration Example and the Like of Embodiment 4]

In the embodiment, as compared with Embodiments 1 to 3, only the algorithm of primality determination is modified, and therefore the hardware (FIG. 3), the interaction (FIG. 4), and the RSA encryption key generation program (FIG. 5) are completely the same.

As described above, although the invention made by the present inventor has been described specifically based on the embodiments, it is apparent that the present invention is not limited thereto and various modifications may be made without departing from the scope of the invention.

For example, as the hardware for carrying out the algorithm according to the present invention, a semiconductor device with a CPU, a coprocessor, and a non-volatile memory has been described as an example, but the method of supplying programs is not necessarily by means of the non-volatile memory, and moreover if the required speed performance is low, there is no need to mount the coprocessor for speeding up special calculations including the power residue calculation.

Moreover, as an application example of the present invention, an IC card has been illustrated, but application of the present invention to other systems using encryption is easy.

What is claimed is:

1. A semiconductor device comprising: a random number generator; a modulus generator; an exponent generator; a power residue calculating unit; and a determination unit, and determining primality of an input prime number candidate, wherein the random number generator generates a random number as a randomizing number, wherein the modulus generator generates a first integer based on the prime number candidate and the randomizing number, wherein the exponent generator generates a second integer, wherein the power residue calculating unit carries out power residue calculation, with the first integer as a modulus and the second integer as an exponent, and wherein the determination unit determines primality of the prime number candidate based on an output of the power residue calculating unit.

2. A semiconductor device comprising: a random number generator; a modulus generator; an exponent generator; a power residue calculating unit; and a determination unit, and determining primality of an input prime number candidate, wherein the random number generator generates a random number as a randomizing number, wherein the modulus generator generates a product of the prime number candidate and the randomizing number as a first integer, wherein the exponent generator generates a product of a number obtained by subtracting one from the prime number candidate and a number obtained by subtracting one from the randomizing number, as a second integer, wherein the power residue calculating unit carries out power residue calculation, with the first integer as a modulus and the second integer as an exponent, and wherein the determination unit determines primality of the prime number candidate based on an output of the power residue calculating unit.

3. The semiconductor device according to claim 2, further comprising a randomizing number generator, wherein the random number generator generates the random number, and inputs the same to the randomizing number generator, and wherein the randomizing number generator sets the random number as the randomizing number when the random number is a prime number.

4. The semiconductor device according to claim 2, further comprising a randomizing number generator, wherein the random number generator generates a second random number equal to or less than a predetermined value L, and inputs the same to the randomizing number generator, and wherein the randomizing number generator generates the second random number as the randomizing number when the second random number satisfies all of the following conditions 1 to 3, Condition 1: the second random number does not have a prime number smaller than a predetermined value A, as a factor, Condition 2: a result of power residue calculation, when the predetermined value A is set to a base, a number obtained by subtracting one from the second random number is set to an exponent, and the second random number is set to a modulus, is one, Condition 3, an integer is equal to or less than the predetermined value L, a result of power residue calculation, when the predetermined value A is set to a base, a number obtained by subtracting one from the integer is set to an exponent, and the integer is set to a modulus, is one, but the integer is not prime number, and the second random number differs from any one of the integers when the second random number is compared with all the integers.

5. The semiconductor device according to claim 2, wherein it is determined whether or not the prime number candidate is divisible by at least one prime number, and when as the result of the determination it is divisible, a next prime number candidate is generated, while when as the result of the determination it is not divisible, the prime number candidate is output to the modulus generator and the exponent generator.

6. A semiconductor device comprising: a random number generator; a randomizing number generator; a modulus generator; an exponent generator; a power residue calculating unit; and a determination unit, and determining primality of an input prime number candidate,
   wherein the random number generator generates a random number sequence,
   wherein the randomizing number generator generates a randomizing number by prime factor calculation, with an integer calculated based on the random number sequence as an exponent,
   wherein the modulus generator generates a first integer that is a product of the prime number candidate and the randomizing number,
   wherein the exponent generator generates a second integer,
   wherein the power residue calculating unit carries out power residue calculation, with the first integer as a modulus and the second integer as an exponent, and
   wherein the determination unit determines primality of the prime number candidate based on an output of the power residue calculating unit.

7. The semiconductor device according to claim 6,
   wherein the random number generator outputs a random number, whose value is not less than one and not more than k, as an exponent specifying random number,
   wherein the randomizing number generator includes a first array including k elements for storing k mutually different prime numbers and a second array including k elements for storing exponents corresponding to the respective prime numbers,
   wherein a number of times specified by the exponent specifying random number is set to a value of the second array element,
   wherein for a prime number that is a value of each element of the first array, k integers are calculated by power calculation with a value of a corresponding element of the second array as an exponent, and a product of the k integers is calculated and output as the randomizing number.

8. The semiconductor device according to claim 6, wherein a base in power residue calculation is set to be an integer relatively prime to a product of the randomizing number and the prime number candidate.

9. A semiconductor device comprising: a random number generator; a modulus generator; an exponent generator; a power residue calculating unit; and a determination unit, and determining primality of an input prime number candidate,
   wherein the random number generator generates a first random number as a randomizing number,
   wherein the modulus generator generates a product of the prime number candidate and the randomizing number as a first integer,
   wherein the exponent generator factorizes a product of a number obtained by subtracting one from the randomizing number and a number obtained by subtracting one from the prime number candidate into prime factors, calculates the maximum integer "s" and integer P' satisfying an expression $(r-1)(P-1)=2^s P'$, and generates the integer P' as a second integer,
   wherein the power residue calculating unit carries out power residue calculation, with the first integer as a modulus and the second integer as an exponent, and
   wherein the determination unit determines primality of the prime number candidate based on an output of the power residue calculating unit.

10. The semiconductor device according to claim 9,
   wherein a second random number is generated by the random number generator,
   wherein the second random number is selected so as to be a number that is not divisible by the randomizing number,
   wherein the power residue calculating unit carries out power residue calculation, with the second random number as a base, the first integer as a modulus, and the second integer as an exponent,
   wherein the determination unit, when a result of the power residue calculation is any one of 1, rP−1, 1+P(P−1 mod r) (r−2) mod rP or P−1+P(P−1 mod r) (2−P) mod rP, carries out provisional determination that the prime number candidate is a prime number, and
   wherein as long as the provisional determination that the prime number candidate is a prime number is maintained, a new first random number is generated by the random number generator and set to a new randomizing number r, a new second random number is generated and set to a new base A, and primality is determined by repeating the power residue calculation until a number of times of repetition reaches a predetermined number of times.

11. The semiconductor device according to claim 9, further comprising a randomizing number generator,
   wherein the random number generator generates the first random number and inputs the same to the randomizing number generator, and
   wherein the randomizing number generator, when the first random number has 32 bits and both the least significant two bits are 1, and the first random number passes all of a Miller-Rabin test with a base of 2, a Miller-Rabin test with a base of 7, and a Miller-Rabin test with a base of 61, sets the first random number as the randomizing number.

12. A semiconductor device for carrying out primality determination including power residue calculation, said device comprising: a power residue calculating unit; and a determination unit, and determining primality of an input prime number candidate,
   wherein the power calculating unit carries out power residue calculation, with a product of the prime number candidate and a random number as a modulus of the power residue calculation, and
   wherein the device determines primality of the prime number candidate based on an output of the power residue calculating unit.

13. The semiconductor device according to claim 12, wherein a value calculated based on the prime number candidate and the random number is set to an exponent of the power residue calculation.

14. The semiconductor device according to claim 1, wherein two prime numbers are generated in association with the primality determination, and RSA encryption key generation for outputting a public key and a private key based on the two prime numbers is carried out.

15. An IC card comprising the semiconductor device according to claim 1, the IC card including a CPU, a coprocessor, a random number generation circuit, and a memory,
   wherein the coprocessor carries out the power residue calculation, and
   wherein the random number generation circuit constitutes the random number generator, or alternatively supplies a random number serving as a base thereto.

16. The IC card according to claim 15, wherein an RSA key generation program and/or a prime number table are stored in the memory.

17. An IC card comprising the semiconductor device according to claim 1, wherein prior to transaction, a private key and a public key are generated in association with the primality determination, and the public key is transmitted to a key server coupled via an IC card terminal.

* * * * *